United States Patent [19]
Uomori

[11] Patent Number: 5,726,704
[45] Date of Patent: Mar. 10, 1998

[54] STEREOSCOPIC IMAGE PICKUP AND DISPLAY APPARATUS

[75] Inventor: Kenya Uomori, Hirakata, Japan

[73] Assignee: Matsushita Electric Industrial Co., Ltd., Japan

[21] Appl. No.: 589,374

[22] Filed: Jan. 22, 1996

Related U.S. Application Data

[62] Division of Ser. No. 297,307, Aug. 26, 1994.

[30] Foreign Application Priority Data

Aug. 26, 1993 [JP] Japan .................. 5-211531
Oct. 21, 1993 [JP] Japan .................. 5-263753

[51] Int. Cl.$^6$ .................. H04N 13/00
[52] U.S. Cl. .................. 348/47; 348/51
[58] Field of Search .................. 348/42, 46–48, 348/51–54; 359/466; H04N 13/00

[56] References Cited

U.S. PATENT DOCUMENTS

| | | | |
|---|---|---|---|
| 3,636,254 | 1/1972 | Johnston | 348/47 |
| 4,647,965 | 3/1987 | Imsand | 348/47 |
| 4,819,064 | 4/1989 | Diner . | |
| 4,987,487 | 1/1991 | Ichinose et al. | 348/42 |
| 5,020,878 | 6/1991 | Brokenshire et al. | 359/466 |
| 5,034,809 | 7/1991 | Katoh | 348/42 |
| 5,065,236 | 11/1991 | Diner | 348/42 |
| 5,101,268 | 3/1992 | Ohba | 348/47 |
| 5,119,189 | 6/1992 | Iwamoto et al. . | |
| 5,142,357 | 8/1992 | Lipton et al. | 348/48 |
| 5,142,642 | 8/1992 | Sudo . | |
| 5,175,616 | 12/1992 | Milgram et al. . | |
| 5,432,543 | 7/1995 | Hasegawa et al. . | |

FOREIGN PATENT DOCUMENTS

| | | |
|---|---|---|
| 0279092 | 8/1988 | European Pat. Off. . |
| 0389090 | 9/1990 | European Pat. Off. . |
| 60-236394 | 11/1985 | Japan . |

OTHER PUBLICATIONS

Bernd Kost, "Konstruktion von Zwischenansichten fur Multi–Viewpoint–3DTV–Systeme", Fernseh & Kino Technik 42 (1988) Feb., No. 2, Heidelberg, W. Germany. (No Translation).
European Search Report.

*Primary Examiner*—Richard Lee
*Attorney, Agent, or Firm*—Ratner & Prestia

[57] ABSTRACT

Binocular parallax of a captured image is detected, and image pickup cameras are controlled so that their optic axes converge at an optimum point to ensure that the parallax of the captured image comes within the binocular fusing range of a viewer. Further, an optimum fixating point is calculated that enables the viewer to perceive the stereoscopic depth of the object over the widest possible range, and control is performed so that the fixating point is reproduced at a surface of a stereoscopic image display or at a designated distance from the surface. This suppresses the unnatural feel when the viewer views stereoscopic images.

2 Claims, 22 Drawing Sheets

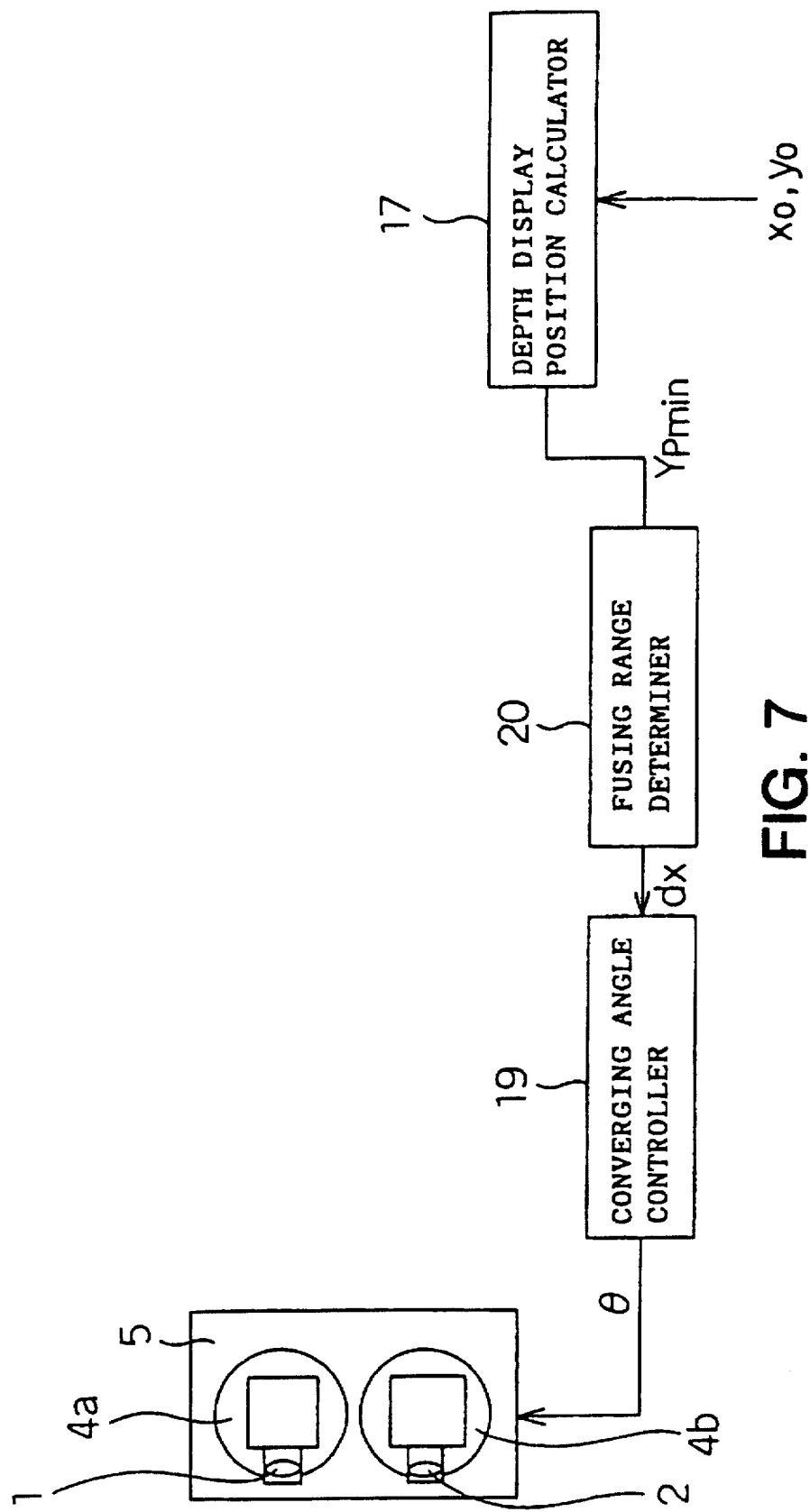

LEFT EYE    RIGHT EYE

←── 2We ──→

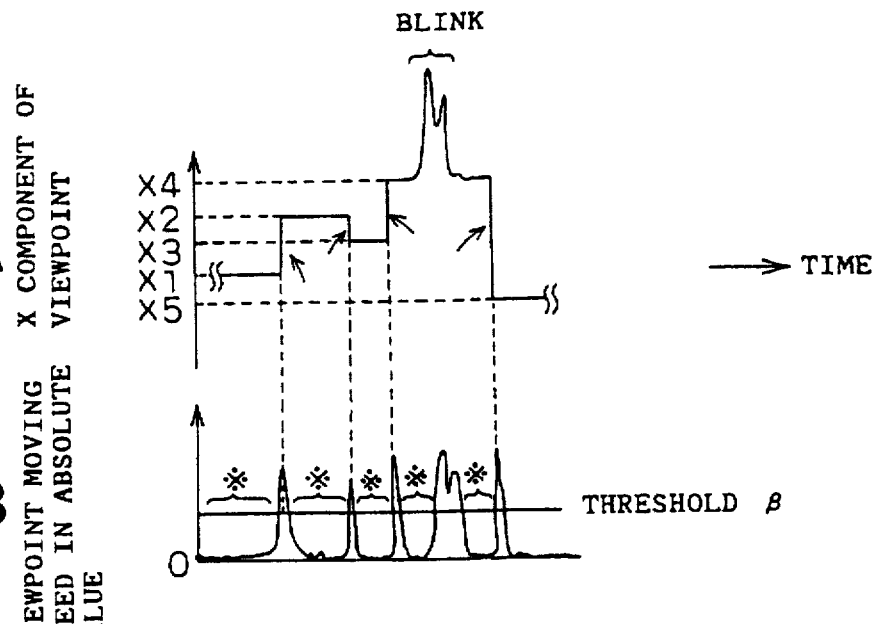
FIG. 22A
FIG. 22B
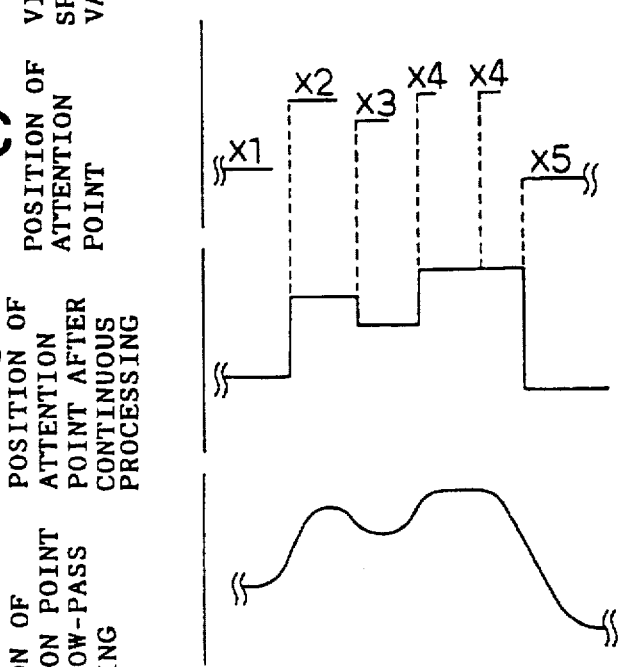
FIG. 22C
FIG. 22D
FIG. 22E

STEREOSCOPIC IMAGE PICKUP AND DISPLAY APPARATUS

This application is a division of application Ser. No. 08/297,307, filed Aug. 26, 1994, (pending)

BACKGROUND OF THE INVENTION

1. Field of the Invention

The present invention relates to a stereoscopic image pickup and display apparatus for recording and displaying a stereoscopic image of an object.

2. Description of the Related Art

An example of a prior art stereoscopic image pickup apparatus is shown in FIG. 10.

The apparatus shown comprises two ordinary cameras mounted on two separate universal heads, the two cameras corresponding to the left and right eyes of a human. The cameras are secured to rotation controllers 3 and 4, respectively, so that they are rotatable in a horizontal plane. The spacing between the two cameras is adjustable on a camera spacing controller 5. The entire camera construction is supported on a tripod 6. Top plan views of this prior art stereoscopic image pickup apparatus are given in FIGS. 11(a) and 11(b): (a) shows the apparatus in a parallel shooting position where the optic axes of the cameras are set parallel to each other, and (b) illustrates a converging shooting position where the optic axes of the cameras are tilted so that they intersect each other. The rotation controllers 3 and 4 are operated to rotate the respective cameras and set them in the parallel shooting or the converging shooting position. The camera spacing is adjustable by varying Wc. In shooting an object in three dimensions, the camera spacing Wc and the distance dx to the converging point greatly affect the quality of the resulting stereoscopic image. The camera spacing Wc affects the size of the object to be displayed as well as the amount of the horizontal parallax to be reproduced. The distance dx to the converging point has a significant effect on the distortion of the recorded image as well as on the amount of the horizontal parallax (which affects the binocular fusing range of the viewer). In the prior art stereoscopic image pickup apparatus, the camera spacing Wc and the distance dx to the converging point are set by an operator based on his experience so that the recorded image can be perceived properly when viewed by a viewer. Here, "perceived properly" essentially means bringing the horizontal parallax of the stereoscopic image within the fusing range of the viewer's eyes when the image is viewed by the viewer. The fusing range will be explained in further detail in the preferred embodiments of the present invention. FIG. 12 is a schematic diagram of a prior art stereoscopic image display apparatus for reproducing a stereoscopic image signal recorded by the stereoscopic image pickup apparatus. In the display apparatus, two separate images, one for each eye, recorded by the stereoscopic image pickup apparatus are reproduced by projectors 9 and 10, are polarized through two polarizers 11 oriented perpendicular to each other, and are focused onto a screen 12. When these images are viewed by a viewer wearing a pair of polarizing glasses 13, the right-eye image is reflected only into the viewer's right eye and the left-eye image only into the viewer's left eye.

FIG. 13 shows the screen of the stereoscopic image display apparatus as viewed from above. If IL and IR represent the left- and right-eye spot images obtained by the stereoscopic image pickup apparatus, a viewer with an interocular distance of We perceives the object virtually lying at the intersection Cl between the visual axes. Thus, the viewer can perceive the depth of the displayed image by binocular stereoscopic vision. In another prior art stereoscopic image display method, as shown in FIG. 14, images displayed on two CRTs with crossed polarizers are combined by a half-silvered mirror without using a screen, and the combined image is viewed through glasses with the corresponding polarizers. In any case, the principle of making the viewer perceive the depth of an image is the same.

Next, the perception of depth will be described in further detail with reference to FIG. 15. This diagram explains how a viewer perceives image depth based on the parallax between his left and right eyes. In the diagram, A, B, and P represent objects (points), CL is the center of rotation of the viewer's left eye 26, CR is the center of rotation of the viewer's right eye 27, and FL and FR are foveae of the viewer's left and right eyes, respectively (the fovea is the region in the retina where there is the greatest acuity of vision; when a human views an object, an image of the object is focused onto the fovea). Now suppose that the viewer focuses his eyes on the point P. In this case, the left and right eyeballs move so that images of the point P are focused on the respective foveae, FL and FR. At the same time, images of the point A situated nearer to the eyes than the point P are focused on AL and AR on the retinas of the left and right eyes. Similarly, images of the point B farther from the point P are focused on BL and BR on the retinas of the left and right eyes. At this time, the distance ALBL between the images of the point A and point B formed on the retina of one eye is different from the corresponding distance ARBR in the other eye. This difference in distance corresponds to the distance between the point A and point B in the direction of depth. In terms of angle, the binocular parallax δBA between the point B and point A is expressed as δBA=δB−δA, the amount of which corresponds to the distance between the point A and point B in the direction of depth. A human calculates this difference in his brain to perceive the depthwise position of an object, i.e., LAB in FIG. 15. As the distance to an object increases, a human's perception of the absolute distance LA, LB to the point A, B becomes less sensitive while his perception of the relative distance LAB becomes more sensitive.

However, in the prior art construction described above, a viewer perceives the object lying at position Cl when the actual images are focused on the display screen 12. That is, the actually displayed images and the image as viewed by the viewer are at different fixating positions of the eyes. This gives rise to a conflict between the convergence point of the visual axes of the viewer's eyes (both eyes turn inward with the eyeballs directed to the nearer position Cl) and the accomodation point of the eyes (fixating of the eyes). If the amount of this conflict becomes too large, a human becomes unable to perceive the left and right images as a single image, and perceives them as a double image. Even if the image does not appear double, the resulting stereoscopic image may appear very unnatural and may make the viewer feel sick.

To describe in further detail, in FIG. 15 where the viewer focuses his eyes on the point P, a human can calculate the depth when the amount of the binocular parallax δ is within a range of ±0.5°; if the depthwise distance becomes larger (the absolute value of the binocular parallax δ becomes larger), the sense of depthwise distance decreases, and if the distance increases further, the object will appear double, making it difficult to perceive the depth and the image very unpleasant to view. Here, suppose that the points A, B, and P in FIG. 15 are displayed on the stereoscopic image display apparatus of FIG. 14. As the position of the reproduced stereoscopic image moves farther away from the position 28 of the CRT surface where the images are displayed, the displacement between the fixating position (CRT surface) of the eye lens and the depthwise position of the presented image becomes larger. Human vision has a threshold of tolerance for the displacement between the CRT surface and the stereoscopic image display position. If the displacement becomes larger than this threshold, images of the intended object cannot be focused on the foveae of both eyes, and the viewer perceives them as a double image.

Considering the above facts, it is clear that a human's depth perception by binocular stereoscopic vision is limited to within a certain range centering around the fixating point P. To perceive a broader three-dimensional world, a human moves the fixating point P in depthwise direction, perceives three-dimensional geometries around respective fixating points, and merges them to perceive the entire perspective. However, with the prior art stereoscopic image display apparatus, since there are tolerable limits to the displacement between the fixating position (CRT surface) of the eye lens and the depthwise position of the presented image, it is not possible to observe the entire space around the object. Furthermore, since there always is a displacement between the fixating position (CRT surface) of the eye lens and the depthwise position of the presented image, it is difficult to move the fixating point quickly. These factors combined, the prior art stereoscopic image display apparatus has not been able to present images that are easy on the eyes and that have good visibility.

To compensate for these shortcomings, in operating the prior art stereoscopic image pickup apparatus the operator had to measure the shooting distance in the field and determine Wc and dx in FIG. 11 by accounting for the size of the stereoscopic image display apparatus used and the viewing distance from the audience, thereby avoiding the above-stated situation as far as possible. However, the calculations were not accurate since they were based on rough measurement of the shooting distance or on the experience of the operator, and camera parameters were set focusing on a single object so that the object could be viewed in three dimensions with both eyes without strain. Further, where the depth to be reproduced varies in the time domain, such as the object moving in depthwise direction, it was not possible to determine We and dx optimally.

SUMMARY OF THE INVENTION

The present invention provides a stereoscopic image pickup and display apparatus consisting of a stereoscopic image pickup apparatus and a stereoscopic image display apparatus in combination: the stereoscopic image pickup apparatus comprises an image pickup device for capturing an object from different viewpoints; a converging angle moving mechanism for varying the converging angle of the image pickup device; a signal processor for extracting image data from the image pickup device; a parallax calculator for calculating the parallax of an image by using an output of the signal processor; a parallax processor for detecting the smallest value (the parallax of the nearest object) out of outputs from the parallax calculator; a depth display position calculator for calculating from an output of the parallax processor the depthwise position of an object to be reproduced at the nearest point when a captured image is displayed by the stereoscopic image display apparatus; a fusing range verifier for verifying on the basis of an output of the depth display position calculator whether the nearest point is within a fusional range of a viewer when the viewer views the reproduced image; and a converging angle controller for controlling the converging angle moving mechanism on the basis of an output of the fusing range verifier so that the object at the nearest point is positioned within the fusional range of the viewer; and the stereoscopic image display apparatus comprises a parallax calculator for calculating the binocular parallax or three-dimensional position of an object; an fixating point calculator for calculating an average value for the depthwise position of the object over an entire screen, or an weighted average value with greater weight given to the center of the screen, from an output of the parallax calculator; and a parallax controller for performing control so that the depthwise position indicated by an output of the fixating point calculator is reproduced at a surface of a stereoscopic image display or at a designated distance from the surface.

With the above construction of the present invention, the binocular parallax of a captured image is detected, based on which the depthwise position of an object at the nearest point to the viewer is calculated, and the converging angle moving mechanism is controlled so that the nearest point comes within the fusional range of the viewer viewing the reproduced image; furthermore, from the binocular parallax of the image, an optimum fixating point is calculated that enables the viewer to perceive the stereoscopic depth of the object over the widest possible range, and control is performed so that the fixating point is reproduced at the surface of the stereoscopic image display or at a designated distance from the surface.

BRIEF DESCRIPTION OF THE DRAWINGS

FIG. 7 is a diagram showing the configuration of a stereoscopic image pickup apparatus according to a second embodiment of the invention;

FIG. 22 is a diagram showing a method of calculating the position of the fixating point;

DESCRIPTION OF THE PREFERRED EMBODIMENTS

Figure 1:
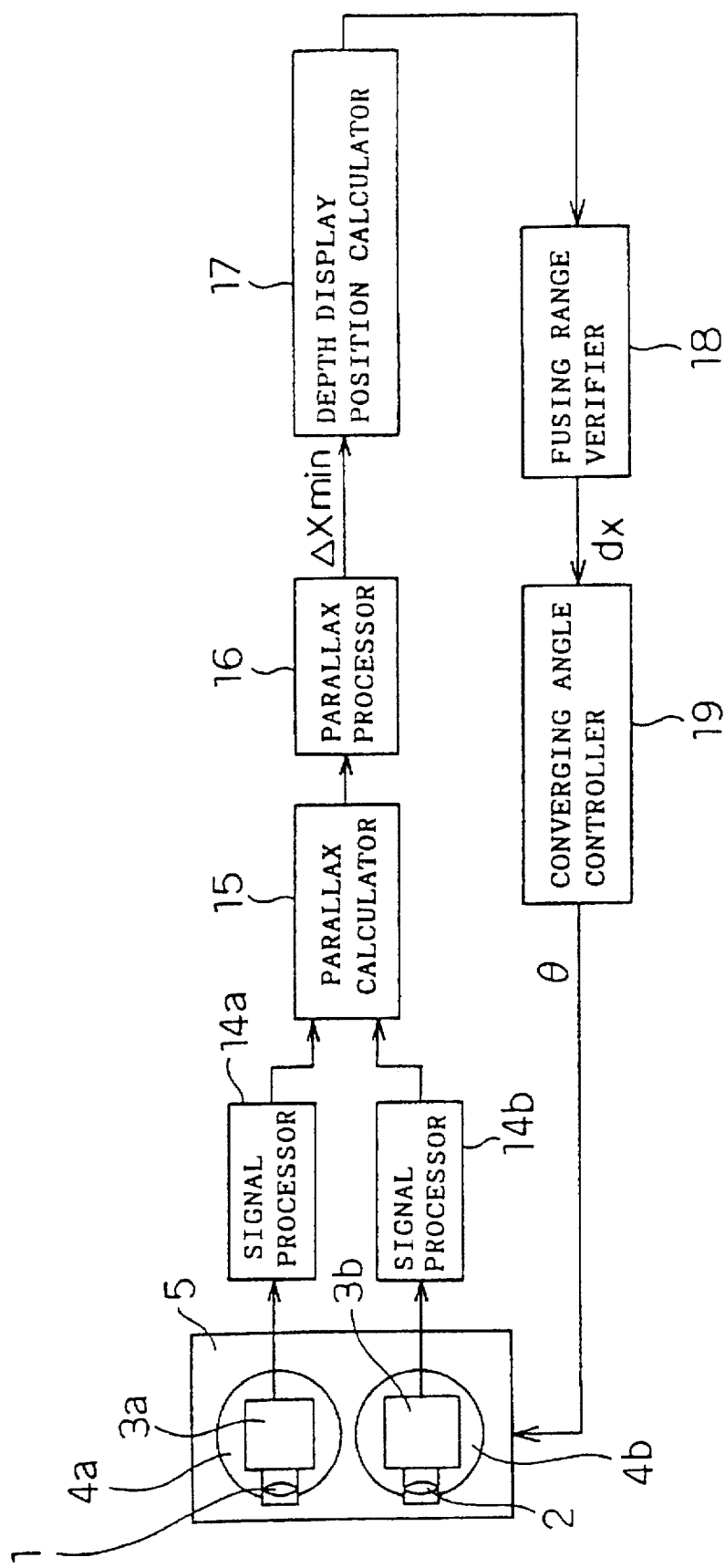
FIG. 1 is a diagram showing the configuration of a stereoscopic image pickup apparatus according to a first embodiment of the invention.

FIG. 1 is a diagram showing the configuration of an image pickup section in a stereoscopic image pickup and display apparatus according to a first embodiment of the present invention. In FIG. 1, the numerals 1 and 2 are lenses, 3a and 3b are camera bodies, 4a and 4b are rotation controllers, and 5 is a camera spacing controller. These components are the same as those used in the prior art. The numerals 14a and 14b are signal processors each for converting the camera signal into the luminance signal, 15 is a parallax calculator for calculating horizontal parallax from left and right images, 16 is a parallax processor for detecting the smallest parallax, 17 is a depth display position calculator for calculating the spatial position of an object nearest to the viewer, 18 is a fusing range verifier for verifying whether the spatial position of the object nearest to the viewer is within the fusing range of the viewer's eyes, and 19 is a converging angle controller for controlling the rotation controllers 4a, 4b so that the spatial position of the object nearest to the viewer comes within the fusing range of the viewer's eyes.

Before describing the operation of the thus constructed stereoscopic image pickup device and display section of the present embodiment, we will first describe the modeling theory of the image pickup system and display system and the characteristics of a viewer's binocular fusing range.

Figure 2B:
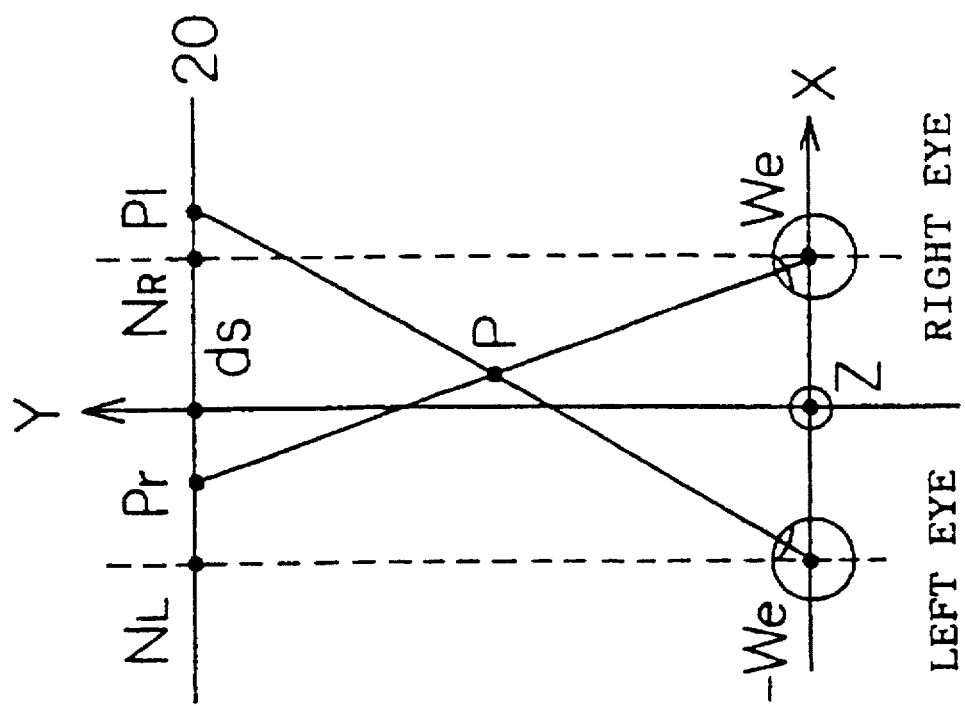
FIG. 2 is a set of diagrams showing an imaging coordinate system and a display coordinate system, respectively, for a stereoscopic image.
Figure 2A:
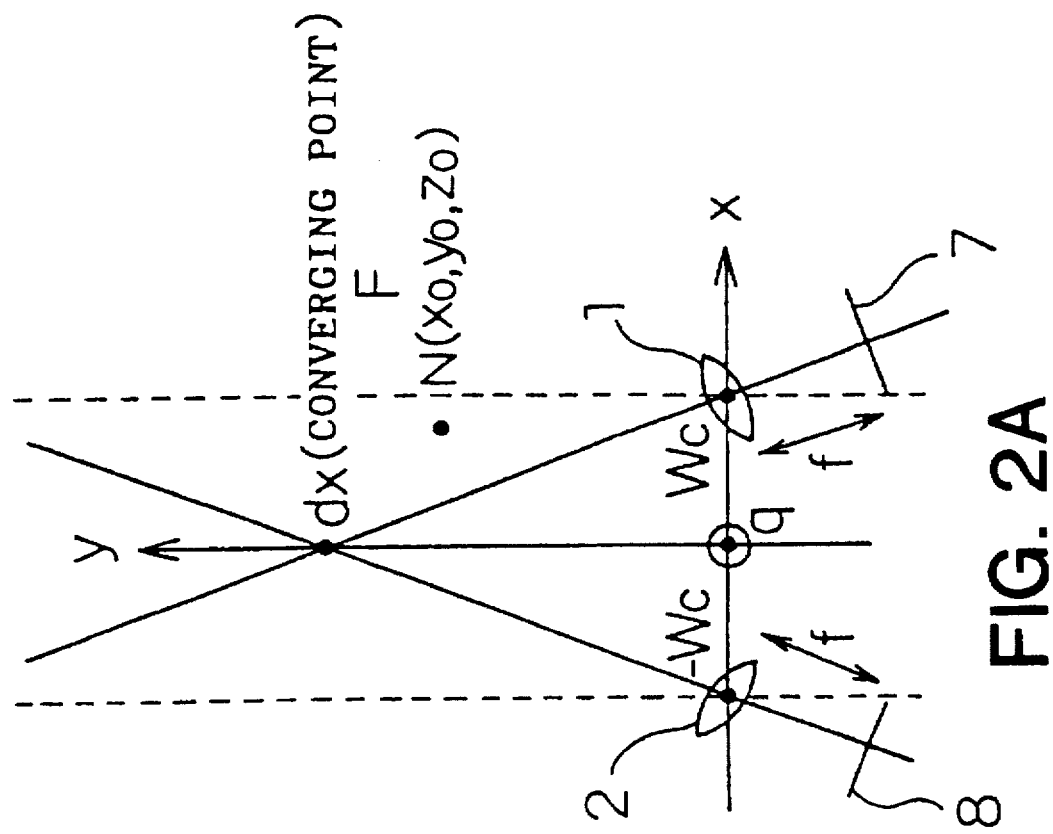

First, models of the image pickup system and display system will be described with reference to FIG. 2. FIG. 2(a) shows a model of the image pickup system. The image pickup cameras are arranged symmetric to each other with their optic axes directed to a converging point F (0, dx, 0). In the coordinate system shown here, the centerpoint of the line joining the two cameras is the origin, the two cameras are arranged along the x-axis, the direction of depth is plotted along the y-axis, and the direction of height along the z-axis. The left and right lenses are positioned at (−Wc, 0, 0) and (Wc, 0, 0), respectively, on the x-axis. The focal length of each lens with respect to the imaging surface (the position of the imaging device or film) 7, 8 is denoted by f. In this arrangement, when dx=∞, the optic axes of the two cameras are parallel to each other (shown by dashed lines in FIG. 2(a)). FIG. 2(b) shows a model of the display system (a model of a stereoscopic image display apparatus). In the display coordinates system, the origin represents the centerpoint between the two eyes of the viewer, the line joining the centers of the two eyes is taken as the x-axis, the direction of depth is plotted along the y-axis, and the direction of height along the z-axis. In this geometry, let the distance from the viewer to the stereoscopic image display screen be denoted by ds, the positions of the left and right eyes be represented by coordinates (−We, 0, 0) and (We, 0, 0), respectively, and the positions of reproduced spot images be designated Pr for the right eye and Pl for the left eye. Then, the viewer will perceive the spot image lying at the point of intersection, P, of the line joining Pr and (We, 0, 0) and the line joining Pl and (−We, 0, 0). Generally, in a stereoscopic image display apparatus having a flat screen such as shown in FIG. 2(b), when dx=∞, and when the position at which a point of infinity was captured (the center position of the captured image) is displayed at NL (−We, ds, 0) for the left image and at NR (We, ds, 0) for the right image, then the x direction of the imaging space, when reproduced, is free from distortion. Further, the y direction of the imaging space, when reproduced, is free from distortion when the following equation holds.

$$ds = M \cdot f \qquad \text{[Mathematical 1]}$$

where M is the ratio of the image on the imaging surface 7, 8 to the size of the image on the screen 12 (provided that the center of the viewer is positioned on the y-axis).

In this case, when viewing a reproduced image of a point of infinity, the visual axes of both eyes are parallel to each other as shown by the dashed lines in FIG. 2(b). Since the object is positioned somewhere between the point of infinity and the distance of 0, the visual axes of the viewer are either directed in parallel or turned inward, but are not turned outward. Since human eyes cannot be turned outward of the parallel lines at the same time, the above provides the condition that achieves the widest possible range for the reproduction of a stereoscopic image.

Of the above distortion-free reproduction conditions, in cases where the condition of dx=∞ in FIG. 2(a) is not satisfied, that is, in cases where dx takes a finite value, the resulting stereoscopic image always suffers spatial distortion. Therefore, the condition of dx=∞ should be observed if at all possible, and only when the resulting stereoscopic image does not lie within the fusing range of the viewer's eyes, dx is varied so that the viewer can fuse the images into a single image. In this case, the value of dx should be set as large as possible to minimize the distortion of the reproduced stereoscopic image. How dx is actually controlled will be described later. At the stereoscopic image reproduction side, images of a point of infinity are reproduced at NR and NL shown in FIG. 2, for maximum reproduction range of the stereoscopic image. To achieve this, since the horizontal coordinate of the point of infinity on the imaging surface 7, 8 in FIG. 2(a) is fx Wc/dx, ΔS is set so that the following equation holds, displaying the left and right images by shifting the right image by ΔS horizontally to the right and the left image by ΔS horizontally to the left.

$$We = \frac{M \cdot f \cdot Wc}{dx} + \Delta S \quad \text{[Mathematical 2]}$$

Next, the binocular fusing characteristics of a human will be described. In the present invention, the parameter dx in the image pickup apparatus is controlled so that when a stereoscopic image is displayed by the stereoscopic display apparatus, the stereoscopic image can be displayed within the range in which the viewer can fuse the left and right images into a signal image. It is therefore necessary that the condition that enables the viewer to achieve binocular fusion be first determined in the geometry shown in FIG. 2(b). In FIG. 2(b), suppose, for example, that the viewer is viewing the point P. In this case, the actual images are focused on the display screen 12. However, the visual axes of both eyes are directed to the point P. Crossing both eyes inward to view a near object is known as convergence eyemovement, and the point P is called the converging point. The convergence eyemovement is controlled using the eye's focus information as well as the information concerning the projected position of the point P on the retina.

In this case, since there is a conflict between the focus information and the retina information, strain is imposed on the viewer's eyes. When the conflict remains within a limited range, the viewer can tolerate the strain, but when the conflict becomes large, the viewer becomes unable to fuse the left and right images into a single image, and eventually perceives them as a double image. Even if the image does not appear double, it imposes strain on human's visual system, leading to fatigue.

Figure 3:
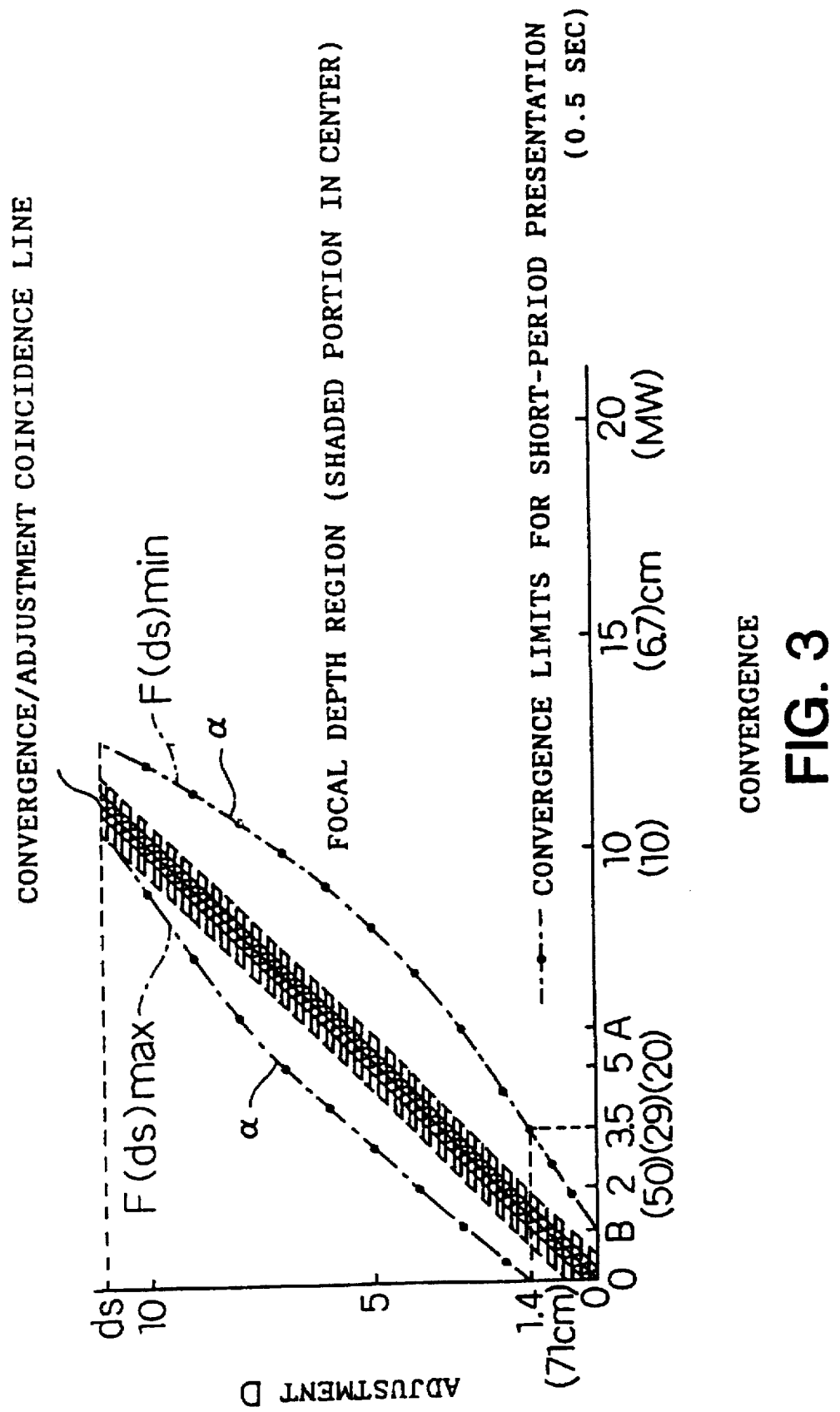
FIG. 3 is a diagram showing allowable ranges of a human's adjusting mechanism and converging mechanism.

Allowable ranges for the fixating position of the eye (hereinafter called the accomodation point) and the position of the converging point (hereinafter called the convergence) based on the projected positions on the retinas were measured. The results are shown in FIG. 3. The convergence plotted along the abscissa is represented by the distance between the viewer and the intersection of the visual axes of both eyes, and the accomodation point plotted along the ordinate is represented by the distance (measured in diopter, the reciprocal of the distance) between the viewer and the position on which the lenses of the eyeballs are focused.

The straight line upward to the right at an angle of 45° represents the condition where the convergence coincides with the accomodation point, the shaded area shows the allowable range within the depth of focus of the eye, and α indicates the fusional limits when an image is presented for 0.5 second. Within the region between the upper and lower fusional limits, the viewer can fuse the stereoscopic images and no double image will occur. In shooting an object, therefore, control is performed so that dx in FIG. 2 will have the largest possible value while satisfying the condition that enables all stereoscopic images to be reproduced within the fusional range.

Figure 4:
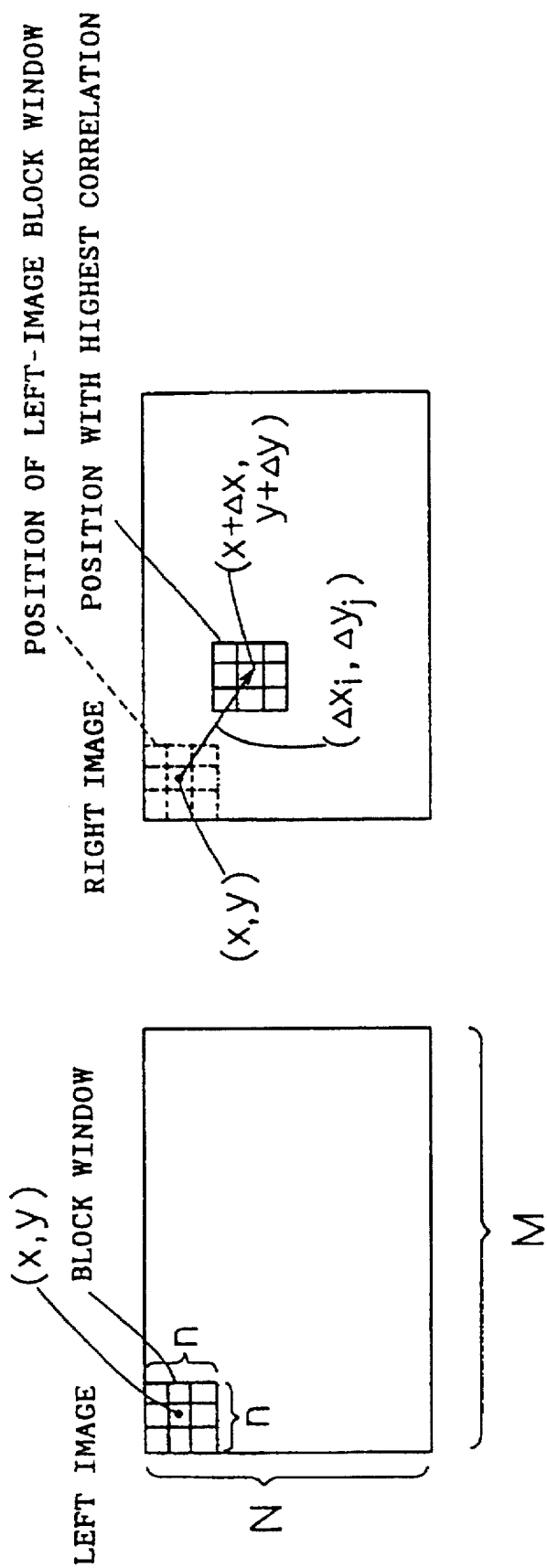
FIG. 4 is a diagram showing a method of calculating the parallax.

First, dx is initially set at ∞ (sufficiently large value). The parallax calculator 15 shown in FIG. 1 calculates a parallax map (a three-dimensional map) from the left- and right-eye images output from the signal processors 14a and 14b. For calculation, there have been proposed a variety of methods, such as a correlation matching method that calculates the correlations of luminance patterns between left and right images, and an edge information matching method that involves matching the edge information between left and right images. The example hereinafter described employs the correlation matching method that calculates the correlations of luminance patterns. The operation of the parallax calculator 15 will be described in detail with reference to FIG. 4. In FIG. 4, consider left and right images each of N×M size. In the left image, consider a block window of n×n pixels (3×3 pixels in the figure). The same image as shown in this block window is located in the right image by using a window of the same size. At this time, the displacement between the left and right blocks is represented by a vector $(\Delta x, \Delta y)$, whose horizontal component $\Delta x$ indicates the binocular parallax of the left and right images at the center coordinate of the block window. By horizontally shifting the reference block window in the left image in sequence across the entire screen, and finding the corresponding block position (representing the binocular parallax) in the right image for each shifted block position, a parallax map (showing depthwise distance at each position on the screen) can be obtained for the entire screen. The displacement between the left and right images at coordinates (x, y), that is, the binocular parallax $(\Delta x, \Delta y)$, can be expressed as $$\Delta x = i, \; \Delta y = j \text{ for Min}\{\text{Corr}(i,j)\} \quad \text{[Mathematical 3]}$$

where $$\text{Corr}(i,j) = \sum_{k=1}^{n \times n} |G_L(x_k, y_k) - G_R(x_k - i, y_k - j)| \quad \text{[Mathematical 4]}$$

In the expression shown in Mathematical 3, Σ means taking the sum of the absolute values by varying the coordinates xk, yk within the block window of n×n. N is the number of pixels in the block window. In the binocular parallax $\Delta x$, $\Delta y$, the component that directly indicates the depthwise position is $\Delta x$. With the left image as the reference, if the value of the binocular parallax is positive, the right image is positioned to the right, and the left image to the left, with respect to the reference image, the object lying farther than the depthwise position at which the binocular parallax is zero; on the other hand, if the value of the binocular parallax is negative, this indicates that the object is positioned nearer than the depthwise position with zero binocular parallax.

Figure 5:
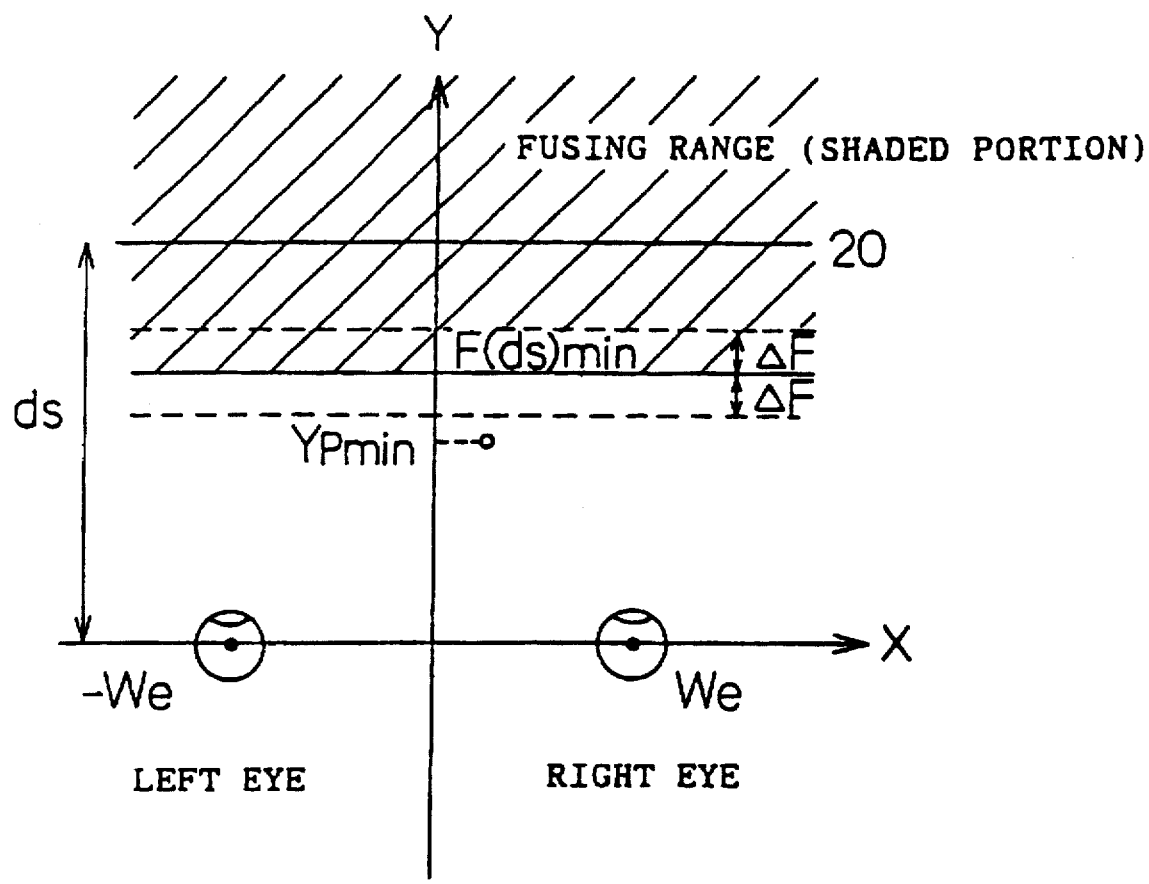
FIG. 5 is a diagram showing a binocular fusing range in a stereoscopic image display apparatus (at viewing distance >71 cm)

Based on the thus obtained parallax map (showing parallax $\Delta x$ calculated at each coordinate position on the entire screen), the parallax processor 16 extracts the smallest parallax value (the parallax of the object reproduced at the position nearest to the viewer) from the entire screen, the extracted value being denoted as $\Delta xmin$. Next, based on $\Delta xmin$, the depth display position calculator 17 calculates the depth reproduction position Ypmin of the stereoscopic image on the stereoscopic image presentation diagram shown in FIG. 5, using the following equation.

$$\frac{Y_{Pmin}}{(max)} = \frac{2We \cdot ds}{-M \cdot \frac{\Delta xmin}{(max)} - 2 \cdot \Delta S + 2We} \quad \text{[Mathematical 5]}$$

where Ypmin represents the y-coordinate of the distance from the origin of the display coordinate system to the position of the object in fixating. In FIG. 5, the viewer's binocular fusing range shown in FIG. 3 is superimposed on the display model of FIG. 2(b). The shaded portion shows the binocular fusional region of the viewer. In the figure, F(ds)min corresponds to the lower curve in FIG. 3. When screen viewing distance ds=71 cm, then F(ds)min=29 cm, which means that the viewer can fuse images within the range from infinity to 29 cm in distance.

As can be seen from FIG. 3, when the viewing distance is 71 cm or greater, the viewer can fuse images within the range from infinity to F(ds)min. When the viewing distance is smaller than 71 cm, the binocular fusing range is also limited by the upper curve in FIG. 3, thus limiting the binocular fusing range to within the distance from F(ds)max to F(ds)min. The following description deals with a case where the viewing distance is 71 cm or greater. The fusing range verifier 18 judges whether Ypmin lies on the boundary of the binocular fusing range.

The judgement is made by evaluating whether the following relation holds or not.

$$F(ds)min+\Delta F \geq Ypmin \geq F(ds)min-\Delta F \qquad \text{[Mathematical 6]}$$

where ΔF is an arbitrary small value. When the relation shown in Mathematical 6 holds, the display position of the reproduced stereoscopic image is within the binocular fusing range; therefore, the fusing range verifier 18 supplies the current dx value as-is to the converging angle controller 19. When Ypmin satisfies the following relation $$YPmin > F(ds)min+\Delta F \qquad \text{[Mathematical 7]}$$

the display position of reproduced Ypmin is completely inside the binocular fusing range. In this case, the fusing range verifier 18 adds Δdx to the current dx value and supplies the resulting new dx value to the converging angle controller 19. However, when θ to be described later (FIG. 6) is close to 0, there occurs little change in the camera's optic axis angle θ; therefore, dx need not be updated.

When Ypmin satisfies the following relation $$YPmin < F(ds)min-\Delta F \qquad \text{[Mathematical 8]}$$

the image reproduced at Ypmin is beyond the viewer's binocular fusing range. In this case, the current dx is reduced by Δdx, and the result is taken as the new dx. If the value obtained by subtracting Δx from the new dx is smaller than dx0 (>0, to be described later), then dx0 is taken as the new dx. Calculation of dx0 will now be described. The fusing range verifier calculates dx such that the y-coordinate of Ypmin agrees with F(ds)min in FIG. 5, and takes the result as dx0.

The following equation is used to calculate dx, which is obtained by eliminating ΔS from equations in Mathematical 5 and 2, substituting F(ds)min for Yp, and solving the result for dx.

$$dx\_0 = \frac{2F(ds)min \cdot f \cdot Wc \cdot M}{2We\, ds + F(ds)min \cdot M \cdot \Delta xmin} \qquad \text{[Mathematical 9]}$$

Using the thus obtained dx, the converging angle controller 19 controls the rotation controllers 4a and 4b to position the camera bodies 3a and 3b so that their optic axes are directed to the converging point shown in FIG. 2(a). FIG. 6(a) shows how the camera control angle θ is defined at this time. When θ=0, the optic axes of the two cameras are parallel to each other. In the above example, dx is updated in increments of Δdx, but in the case of the condition shown by Mathematical 8, the value of dx_0 given by Mathematical 9 may be directly substituted into dx.

In this case, control is performed so that Ypmin, the point in the object nearest to the viewer, becomes equal to F(ds)min, a point near the limit of the fusing range. At this time, if Ypmin is within the binocular fusing range under the condition that makes the optic axes of the camera bodies 3a and 3b parallel to each other, then the optic axes of the two cameras are maintained parallel to each other.

As described above, according to the present embodiment, the parallax of captured images is calculated, and the optic axes of the stereoscopic pickup cameras are controlled so that the smallest parallax value can be reproduced within the fusing range of the viewer's eyes. When the images thus captured are presented for viewing, the viewer can fuse the reproduced stereoscopic images over the widest possible range.

Figure 6B:
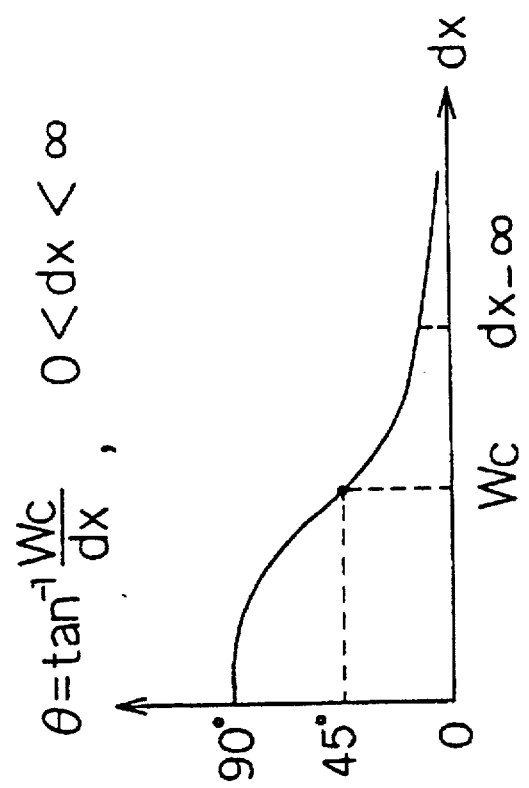
FIG. 6 shows a diagram illustrating the definitions of distance dx to the converging point and angle θ of optic axis rotation, and a diagram plotting distance dx to the converging point as a function of angle θ of optic axis rotation.
Figure 6A:
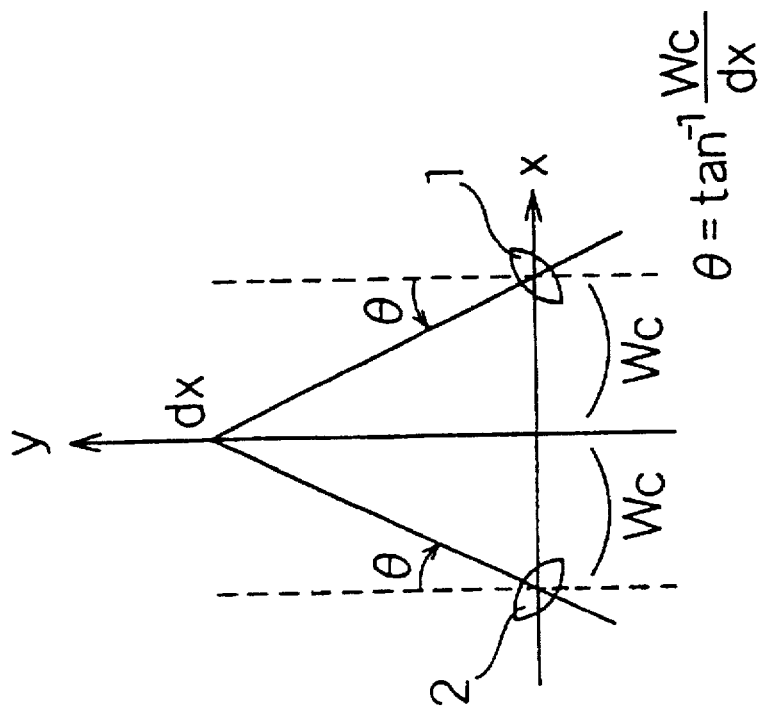

Further, in the first embodiment, the amount of change in dx is large in the vicinity of θ=0, as shown in FIG. 6(b);
therefore, θ may be made equal to 0 at dx_∞. In this case, the initial value of dx is set as dx_∞.

Also, the curve shown in FIG. 6(b) may be linearly approximated. Furthermore, in the conditional judgement expressions shown in Mathematical 6 to 8, an offset Yp_off may be added to Ypmin, and the judgement condition may be shifted along the direction of the y-axis so that the position of Ypmin comes within the fusing range (shaded region).

FIG. 7 is a diagram showing the configuration of an image pickup section in a stereoscopic image pickup and display apparatus according to a second embodiment of the present invention. In the figure, the numerals 1 and 2 are lenses, 3a and 3b are camera bodies, 4a and 4b are rotation controllers, 5 is a camera spacing controller, 17 is a depth display position calculator for calculating the spatial position of an object nearest to the viewer, and 19 is a converging angle controller for controlling the rotation controllers 4a and 4b so that the spatial position of the object nearest to the viewer comes within the fusing range of the viewer's eyes. The differences from the first embodiment are that the coordinates x0, y0 of the nearest object are directly input to the depth display position calculator 17, and that a fusing range determiner is provided that calculates the value of dx to bring the object nearest to the viewer into the fusing range of the viewer's eyes.

The operation of the thus constructed stereoscopic image pickup section of the second embodiment will be described below.

In the shooting condition shown in FIG. 2(a), the coordinates of the point in an object nearest to the cameras are set as N (x0, y0, z0). Prior to shooting the object, the operator measures this distance and inputs x0, y0 to the depth display position calculator 17. These values may be input using a calculator keyboard or any other device that can enter numeric data. Based on these input values, the depth display position calculator 17 calculates the y-coordinate of the display position of the point N in the stereoscopic image reproduction/display coordinate system shown in FIG. 2(b). The calculation is made using the following equation.

$$Y_P = \frac{We \cdot ds}{We - \Delta S - \dfrac{M \cdot f \cdot Wc}{dx}} \cdot \frac{\left(y_0 + \dfrac{Wc^2}{dx}\right)(y_0 - dx) + x_0^2}{\left(y_0 + \dfrac{Wc^2}{dx}\right)^2 - \dfrac{Wc^2}{dx^2} \cdot x_0^2} \qquad \text{[Mathematical 10]}$$

In Mathematical 10, ΔS is determined in accordance with Mathematical 2, as in the first embodiment of the invention. First, Ypmin is calculated with the condition of dx=∞ (the condition that sets the optic axes of the two cameras parallel to each other). Next, using the thus calculated Ypmin, the fusing range determiner 20 determines the converging point dx of the cameras, based on the following relation. If $$YPmin > F(ds)min \qquad \text{[Mathematical 11]}$$

is satisfied, dx=∞ (sufficiently large value) is taken; otherwise, the dx_0 given by Mathematical 9 is calculated, and the result is taken as the new dx.

Based on the thus obtained dx, the converging angle controller 19 calculates the optic axis angle θ of the two cameras. The angle θ is the same as that shown in FIG. 6. The rotation controllers 4a and 4b control the optic axes of the respective cameras so that the thus determined angle θ can be provided.

As described above, according to the present embodiment, the position of the object nearest to the cameras is input, and the converging point dx is determined so that the object can be reproduced within the fusing range of the viewer's eyes, in accordance with which the optic axes of the stereoscopic image pickup cameras are controlled. When the images thus captured are presented for viewing, the viewer can fuse the reproduced stereoscopic images over the widest possible range.

In the second embodiment of the invention, the values x0, y0 are input to the depth display position calculator 17 manually by the operator, but these values may be input automatically by using a distance-measuring device such as a ultrasonic sensor. Also, x0 may be fixed to a predetermined value, and the value of y0 only may be input.

Figure 8:
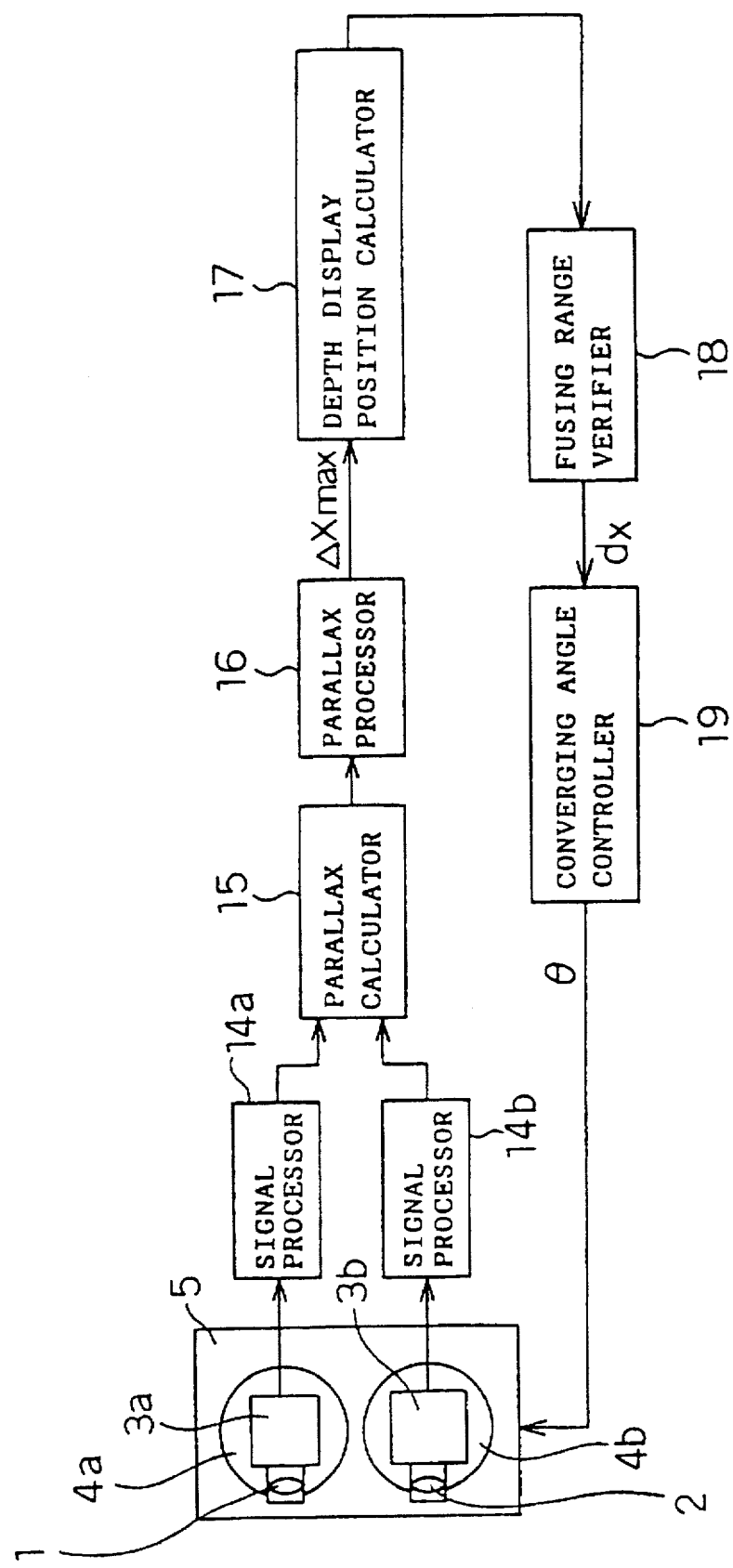
FIG. 8 is a diagram showing the configuration of a stereoscopic image pickup apparatus according to a third embodiment of the invention.

FIG. 8 is a diagram showing the configuration of an image pickup section in a stereoscopic image pickup and display apparatus according to a third embodiment of the present invention. The block construction is the same as that shown in FIG. 1. In FIG. 8, the numerals 1 and 2 are lenses, 3a and 3b are camera bodies, 4a and 4b are rotation controllers, 5 is a camera spacing controller, 14a and 14b are signal processors each for converting the camera signal into the luminance signal, 15 is a parallax calculator for calculating horizontal parallax from left and right images, 16 is a parallax processor for detecting the smallest parallax, 17 is a depth display position calculator for calculating the spatial position of an object farthest from the viewer, and 18 is a fusing range verifier for verifying whether the spatial position of the object farthest from the viewer is within the fusing range of the viewer's eyes.

Further, 19 is a converging angle controller for controlling the rotation controllers 4a, 4b so that the spatial position of the object farthest from the viewer comes within the fusing range of the viewer's eyes.

The differences from the first embodiment are that the parallax processor 16 calculates the largest parallax value, that the depth display position calculator 17 calculates the spatial position of the object farthest from the viewer, and that the fusing range verifier 18 verifies whether the spatial position of the object farthest from the viewer is within the fusing range of the viewer's eyes. In the first embodiment, control was performed based on the smallest parallax value and the nearest object.

The operation of the thus constructed stereoscopic image pickup section of the third embodiment will be described below.

In the first embodiment of the invention, the viewer's viewing distance was set greater than 71 cm, the binocular fusing range was from ∞ to F(ds)min, and ds was controlled so as to bring F(ds)min within the binocular fusing range of the viewer. When ds<71 cm, the distance ranging from F(ds)max to F(ds)min is the binocular fusing range, as described earlier; if F(ds)min is to be brought within the fusing range, control can be performed in the same manner as described in the first embodiment, but in the third embodiment of the invention, control is performed in such a manner as to bring F(ds)max within the binocular fusing range.

Figure 9:
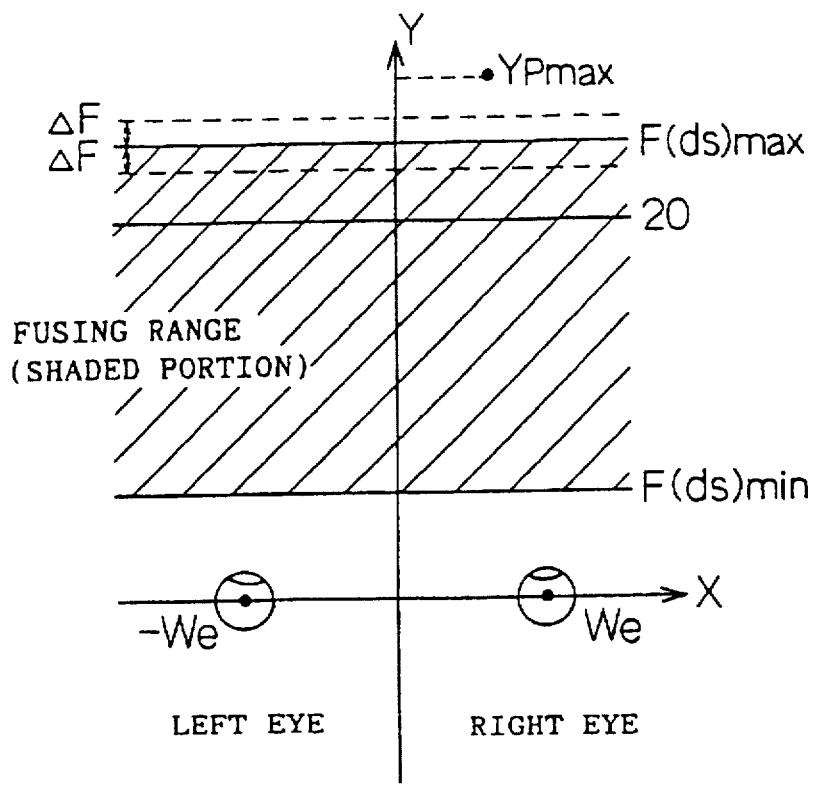
FIG. 9 is a diagram showing a binocular fusing range in a stereoscopic image display apparatus.
Figure 10:
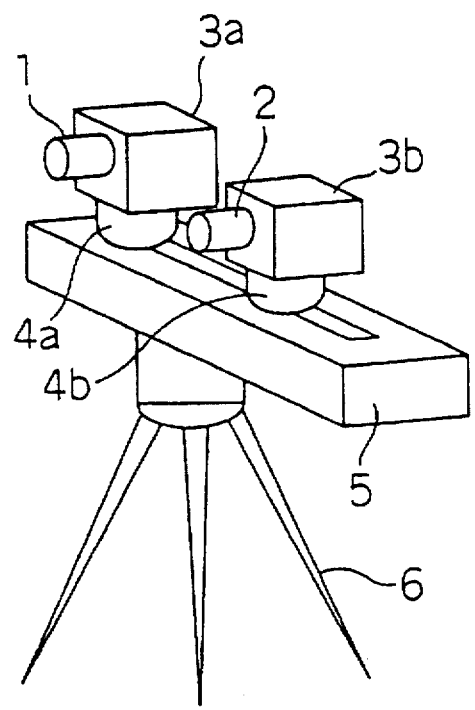
FIG. 10 is a schematic diagram of a prior art stereoscopic image pickup apparatus.
Figure 11B:
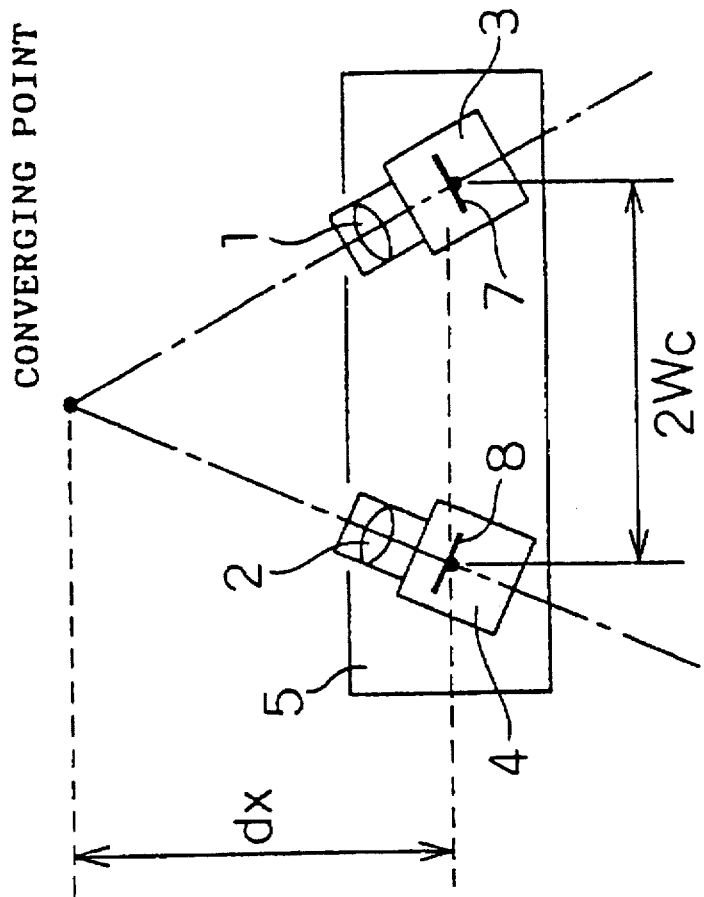
FIG. 11 is a set of diagrams showing stereoscopic image shooting methods (parallel shooting and converging shooting)
Figure 11A:
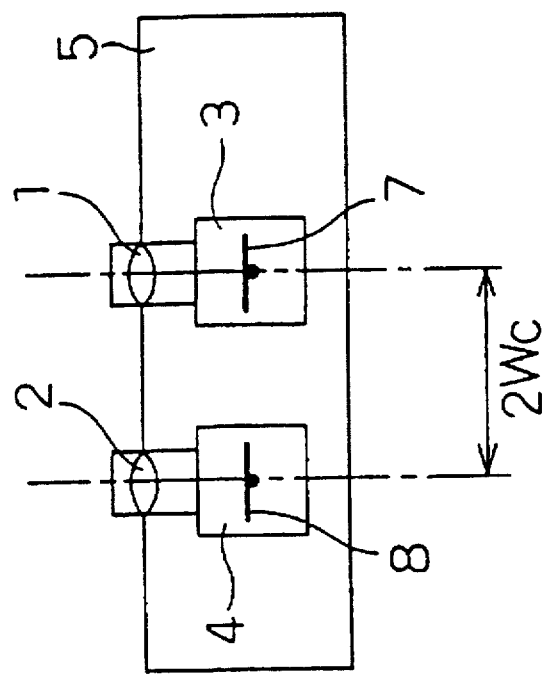
Figure 12:
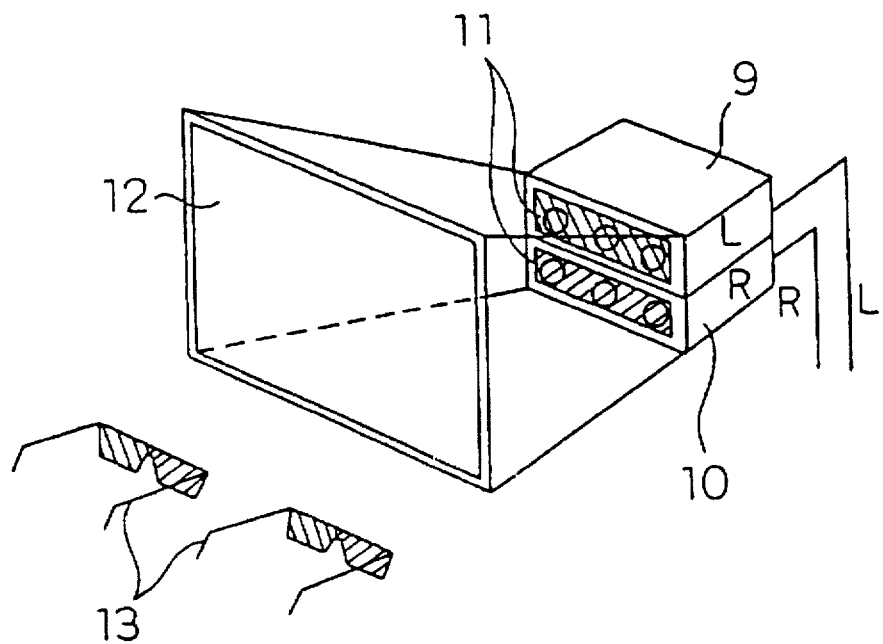
FIG. 12 is a schematic diagram of a stereoscopic image display apparatus.
Figure 13:
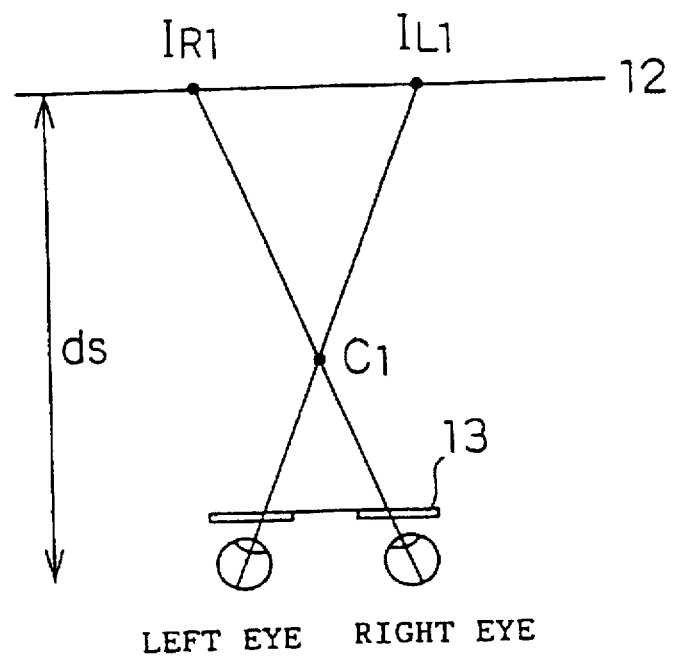
FIG. 13 is a diagram showing a stereoscopic image display position.
Figure 14:
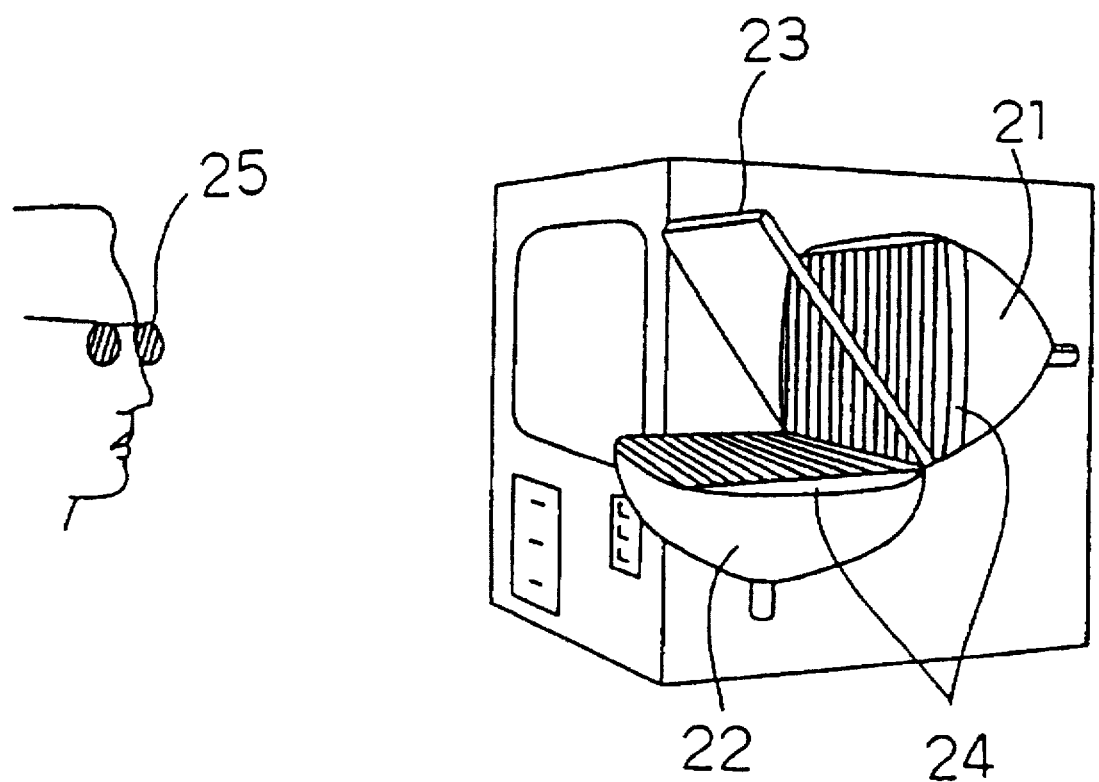
FIG. 14 is an external view of a prior art stereoscopic image display apparatus.

First, dx is initially set at ∞ (sufficiently large value). Next, the parallax calculator 15 calculates a parallax map by using the image signals obtained from the camera bodies 3a, 3b and signal processors 14a, 14b, as in the first embodiment of the invention. The method of calculation is exactly the same as that employed in the first embodiment. Based on the parallax map, the parallax processor calculates the largest parallax value Δxmax (the parallax of the object farthest from the cameras). Next, the depth display position calculator 17, using Mathematical 5, calculates the position at which the farthest object is to be reproduced for display. The coordinate system used here is the same as the stereoscopic image display coordinate system shown in FIG. 2(b). In FIG. 9, the viewer's binocular fusing range shown in FIG. 3 is superimposed on the display model of FIG. 2(b). The shaded portion represents the region where the viewer's binocular fusing can be attained. Here, F(ds)max is given by the upper curve in FIG. 3.

At this time, if the value of Ypmax and the value of the viewer's far point binocular fusing limit satisfy the relation $$F(ds)\text{max}-\Delta F \leq YP\text{max} \leq F(ds)\text{max} \quad \text{[Mathematical 12]}$$

the display position of the reproduced stereoscopic image is within the binocular fusing range. In this case, the fusing range verifier 18 supplies the current dx value as-is to the converging angle controller 19. Further, if Ypmax satisfies the relation $$YP\text{max}<F(ds)\text{max}-\Delta F \quad \text{[Mathematical 13]}$$

the display position of reproduced Ypmax is completely inside the binocular fusing range. In this case, the current dx is reduced by Δdx, and the result is taken as the new dx. If the value obtained by subtracting ΔF from the new dx is smaller than dx1 (>0, to be described hereinafter), then dx1 is taken as the new dx. Calculation of dx1 will now be described. The fusing range verifier 18 calculates dx such that the y-coordinate of Ypmax agrees with F(ds)max in FIG. 5, and takes the result as dx1.

The following equation is used to calculate dx, which is obtained by eliminating ΔS from Mathematical 5 and 2, making Yp=F(ds)min, and solving the result for dx, as in the first embodiment of the invention.

$$dx\_1 = \frac{2F(ds)\text{max} \cdot f \cdot Wc \cdot M}{2We\,ds + F(ds)\text{max} \cdot M \cdot \Delta x\text{max}} \quad \text{[Mathematical 14]}$$

Further, if, as shown in FIG. 9, Ypmax satisfies the relation $$YP\text{max}>F(ds)\text{max}+\Delta F \quad \text{[Mathematical 15]}$$

the image reproduced at Ypmax is beyond the viewer's binocular fusing range. In this case, the fusing range verifier 18 adds Δdx to the current dx and supplies the result to the converging angle controller 19 as the new dx. However, when θ to be described later (FIG. 6) is close to 0, dx need not be updated since there occurs little change in the camera optic axis angle θ described later.

Using the thus obtained dx, the converging angle controller 19 controls the rotation controllers 4a and 4b to position the camera bodies 3a and 3b so that the camera optic axes are directed to the converging point shown in FIG. 2(a). The camera control angle θ here is defined in the same way as defined in the first embodiment of the invention with reference to FIG. 6(a); that is, when θ=0, the optic axes of the two cameras are parallel to each other. In the above example, dx is updated in increments of Δdx, but in the case of the condition shown by Mathematical 15, the value of dx\_1 given by Mathematical 14 may be directly substituted into dx.

In the above operation, control is performed so that Ypmax, the point in the object farthest from the viewer, becomes equal to F(ds)max, the far point limit of the fusing range. At this time, if Ypmax does not come within the binocular fusing range even under the condition that makes the optic axes of the camera bodies 3a and 3b parallel to each other, the optic axes of the two cameras are maintained parallel to each other.

As described above, according to the present embodiment, the parallax of captured images is calculated, and the optic axes of the stereoscopic image pickup cameras are controlled so that the largest parallax value can be reproduced within the fusing range of the viewer's eyes. When the images thus captured are presented for viewing, the viewer can fuse the reproduced stereoscopic images over the widest possible range.

In the first to third embodiments of the invention, noise may be introduced into the output of the parallax calculator 15, depending on the condition of the object being shot; therefore, the output of the parallax calculator 15 may be passed through a time-domain low-pass filter to reduce the noise. Further, control of the two cameras need only be performed slowly; to prevent abrupt movements, $\Delta x_{min}$ output from the parallax processor 16, dx output from the fusing range verifier 18, or dx output from the fusing range determiner 20 may be low-pass filtered in the direction of time.

Figure 16:
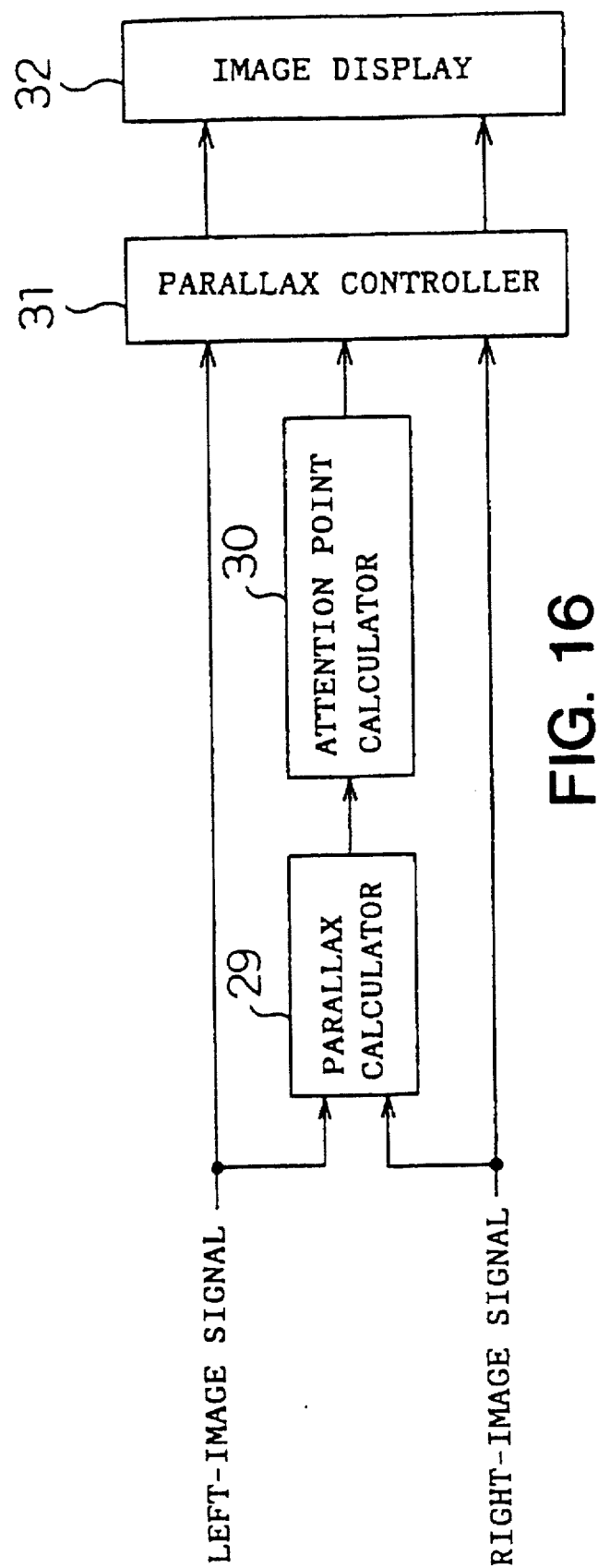
FIG. 16 is a diagram showing the configuration of a stereoscopic image display apparatus according to a fourth embodiment of the invention.

FIG. 16 is a diagram showing the configuration of a display section in a stereoscopic image pickup and display apparatus according to a fourth embodiment of the present invention. In FIG. 16, the numeral 29 is a parallax calculator, 30 is an fixating point calculator, 31 is a parallax controller, and 32 is an image display. The operation of the thus constructed stereoscopic image display of the present embodiment will be described below.

First, the parallax calculator 29 calculates a parallax map (a three-dimensional map) from left- and right-eye images. The same calculation method as used in the first embodiment will be used here, such as the correlation matching method that calculates the correlations of luminance patterns between the left and right images. That is, in FIG. 4, consider a block window of n×n pixels (3 ×3 pixels in the figure) in the left image. Then, the same image as shown in the block window is located in the right image by using a window of the same size. In the displacement ($\Delta x$, $\Delta y$) between the left and right block positions, the horizontal displacement component $\Delta x$ represents the binocular parallax of the left and right images at the center coordinate of the block window.

By horizontally shifting the reference block window in the left image in sequence across the entire screen, and finding the corresponding block position (representing the binocular parallax) in the right image for each shifted block position, a parallax map (showing depthwise distance at each position on the screen) can be obtained for the entire screen. For calculations, the same equation as used in the first embodiment is used, that is $$\Delta x = i, \Delta y = j \text{ for Min}\{\text{Corr}(i,j)\} \qquad \text{[Mathematical 3]}$$

where $$\text{Corr}(i,j) = \sum_{k=1}^{n \times n} |G_L(x_k, y_k) - G_R(x_k - i, y_k - j)| \qquad \text{[Mathematical 4]}$$

Figure 17:
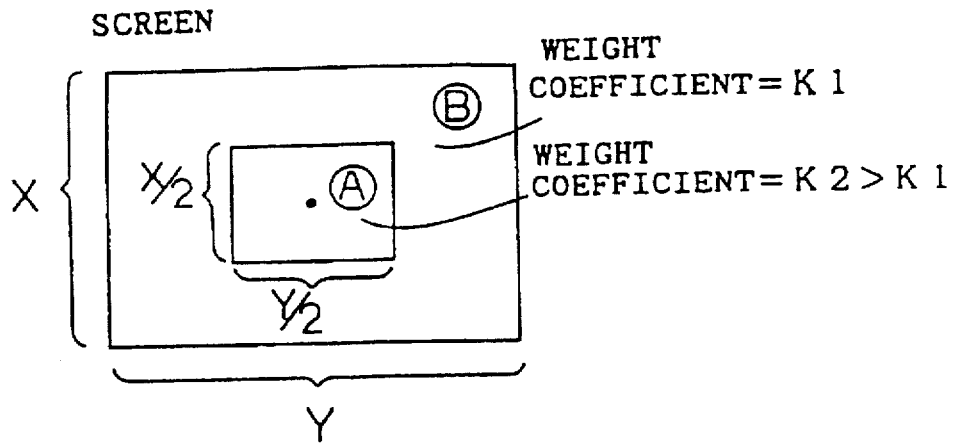
FIG. 17 is a diagram for explaining a technique for obtaining weighted average of parallax.

Based on the thus obtained parallax map (showing parallax $\Delta x$ calculated at each coordinate position on the entire screen), the fixating point calculator 30 calculates an average value for the parallax over the entire screen or a weighted average value $\Delta x_{ave}$ with greater weight at the center of the screen. FIG. 17 shows examples of positions in the screen and their associated weight coefficients. In FIG. 17, the screen of X×Y size is simply divided into two regions, a center region of X/2×Y/2 size and the remaining region, and a weight coefficient K2 is assigned to the center region and K1 to the remaining region. Such regions may be in other shapes such as a circular shape, and the weight coefficient may be varied continuously from the periphery toward the center. The average value $\Delta x_{ave}$ is given by $$\Delta x_{ave} = \qquad \text{[Mathematical 16]}$$

$$\sum_{i,j} \{K \times \Delta x(i,j)\} / \left\{ X \cdot Y \left( K1 \times \frac{3}{4} + K2 \times \frac{1}{4} \right) \right\}$$

where $$\sum_{i,j}$$

means summing about coordinate(i,j) on entire screen, and where K=K2 (region A), and K=K1 (region B). When K1 =K2, a common average is taken over the entire screen.

Figure 15:
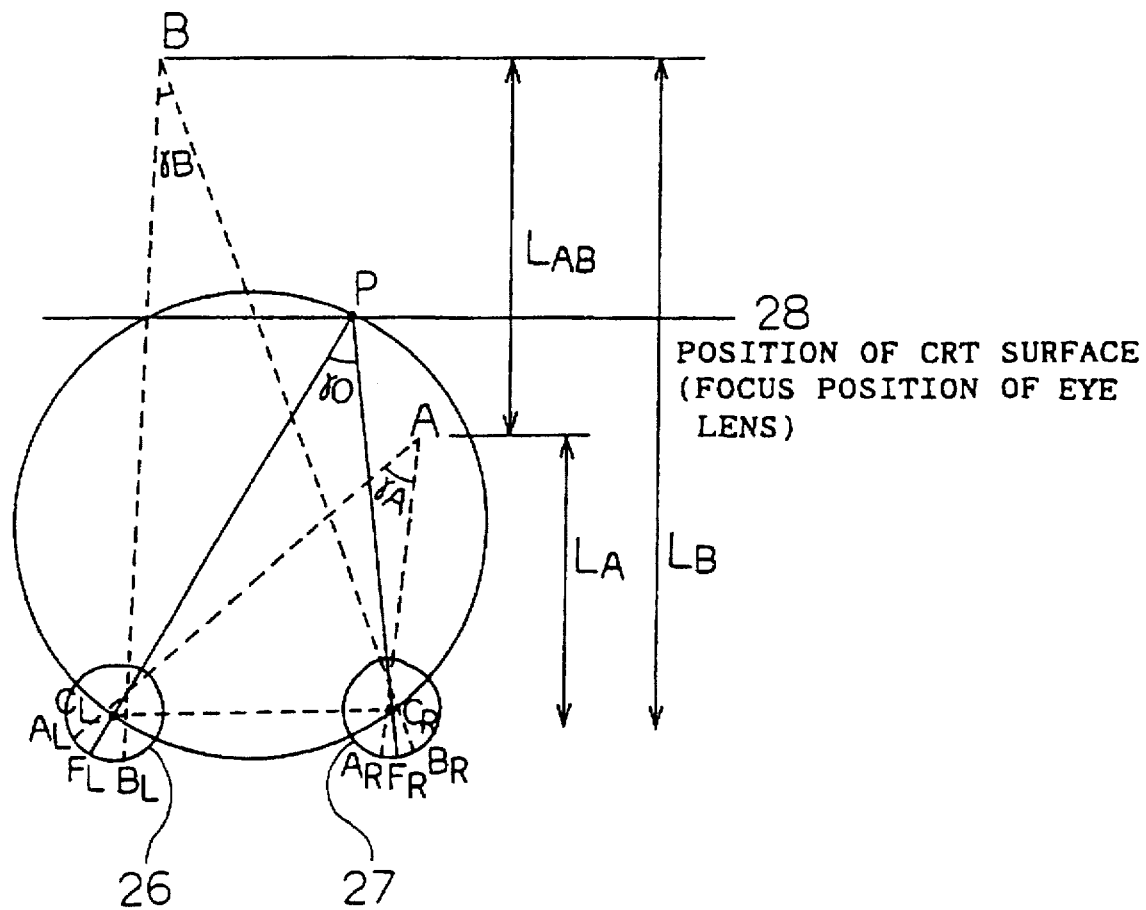
FIG. 15 is a diagram explaining how a viewer perceives depth based on binocular parallax.
Figure 18:
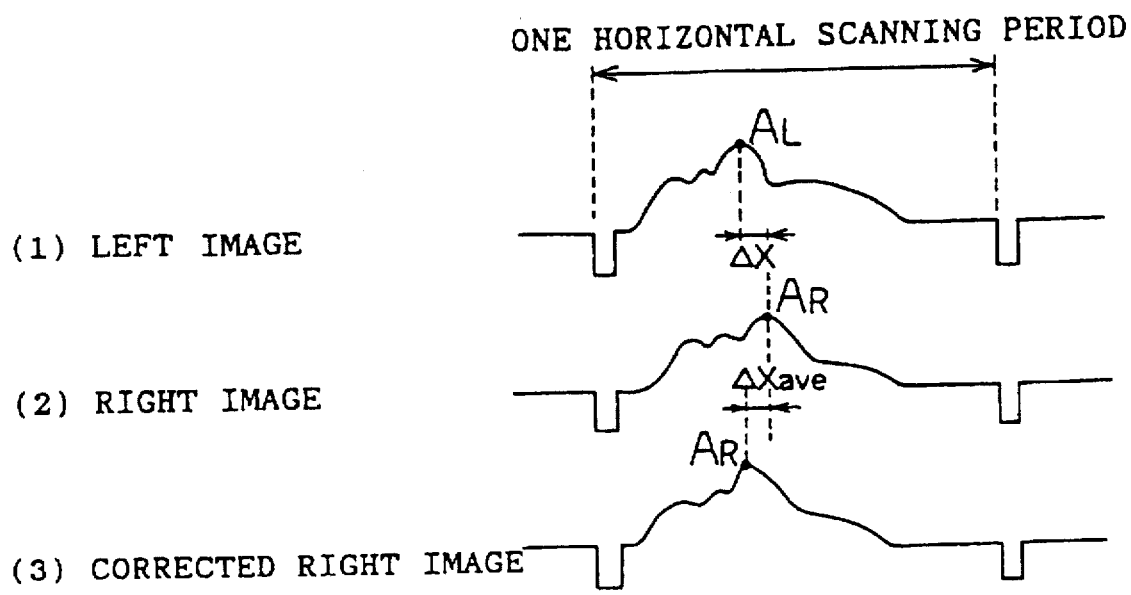
FIG. 18 is a diagram showing the operation of a parallax controller 12.

Using the average value $\Delta x_{ave}$ of the binocular parallax, the parallax controller 31 controls the horizontal read timing of the left and right images and moves the images in horizontal directions. FIG. 18 shows a horizontal scanning period of the video signal. Points AL and AR indicate the same point in the same object in the left and right images, respectively. The binocular parallax $\Delta X$ at the point A, first mentioned, is shown in the figure. As shown in the figure, the right image is shifted by the average value $\Delta x_{ave}$ of the binocular parallax, in a direction that cancels the parallax (i.e., the horizontal read timing of the image is shifted by $\Delta x_{ave}$). In this manner, the image portion having a binocular parallax of $\Delta x_{ave}$ is reproduced at the surface of the image display 32 (reproduced in the same position in the left and right images). Here, the entire images are moved horizontally; as previously described, this is the same as changing LA and LB in FIG. 15, and when the control amount of binocular parallax is small, the change goes relatively unnoticed to the viewer. If the value of $\Delta x_{ave}$ changes too rapidly causing jerky image movements on the display screen, the signal may be low-pass filtered so that the display screen can be controlled using slow movements only.

The fixating point calculator 30 calculates the largest parallax value, instead of an average value for the parallax over the entire screen. When the calculated value is positive, the parallax controller 31 controls the displacement between the left and right images on the screen of the image display 32 so that the maximum value of the displacement does not exceed the viewer's interocular distance (about 65 mm); this brings the displayed images always within the binocular fusing range, and ensures that the visual axes of the viewer's eyes are not forced to diverge. Further, the fixating point calculator 30 calculates the smallest parallax value, instead of an average value for the parallax over the entire screen. When the calculated value is negative, the parallax controller 31 controls the displacement between the left and right images on the screen of the image display 32 so that the minimum value of the displacement does not become smaller than a prescribed amount β; with this setting, the viewpoint of the viewer becomes very near, eliminating a large disparity between the eye's focus information from the stereoscopic image display screen and the converging angle of the visual axes, and the left and right images can be controlled so that the viewer can easily fuse the images.

Furthermore, if the amount of displayed image displacement is changed from $\Delta x_{ave}$ to $\Delta x_{ave} - \alpha$ ($\alpha$ is an arbitrary value), the portion of the parallax represented by $\Delta x_{ave}$ can be set to a prescribed binocular parallax value $\alpha$. In this case, $\alpha=0$ indicates a position on the surface of the image display screen; this position moves forwardly or rearwardly of the image display screen as the value of α is varied. In this case, control is performed using one average binocular parallax value for one picture; on the other hand, in the case of a moving image, an average binocular parallax value may be obtained for each picture (one frame in an NTSC image), and the image display section may be controlled using a signal that is low-pass filtered in the direction of time with the average parallax values taken as time series data. In the first embodiment, only the right image is shifted; alternatively, the right image may be shifted by half the control amount of displacement while the left image is shifted in the opposite direction by the same amount. Also, instead of taking an average binocular parallax, a median (a median processing filter) may be used.

In the present embodiment, the displayed images are controlled only in horizontal directions using the displacement Δxave caused by horizontal parallax. In addition to this, if the image read position in the vertical direction is controlled by using Δyave based on the binocular parallax Δy calculated by the parallax calculator 29, stereoscopic images with reduced vertical parallax can be presented with enhanced visibility. (Vertical displacement between the left and right images would greatly interfere with the binocular fusing ability of the viewer.)

As described above, according to the present embodiment, the stereoscopic image indicated by the average binocular parallax value (which may indicate the depthwise position of the center of the parallax map) can be controlled so that it will be reproduced at the surface of the display screen or at other desired position, thus enabling the viewer always to perceive the stereoscopic depth of the object over the widest possible range.

Figure 19:
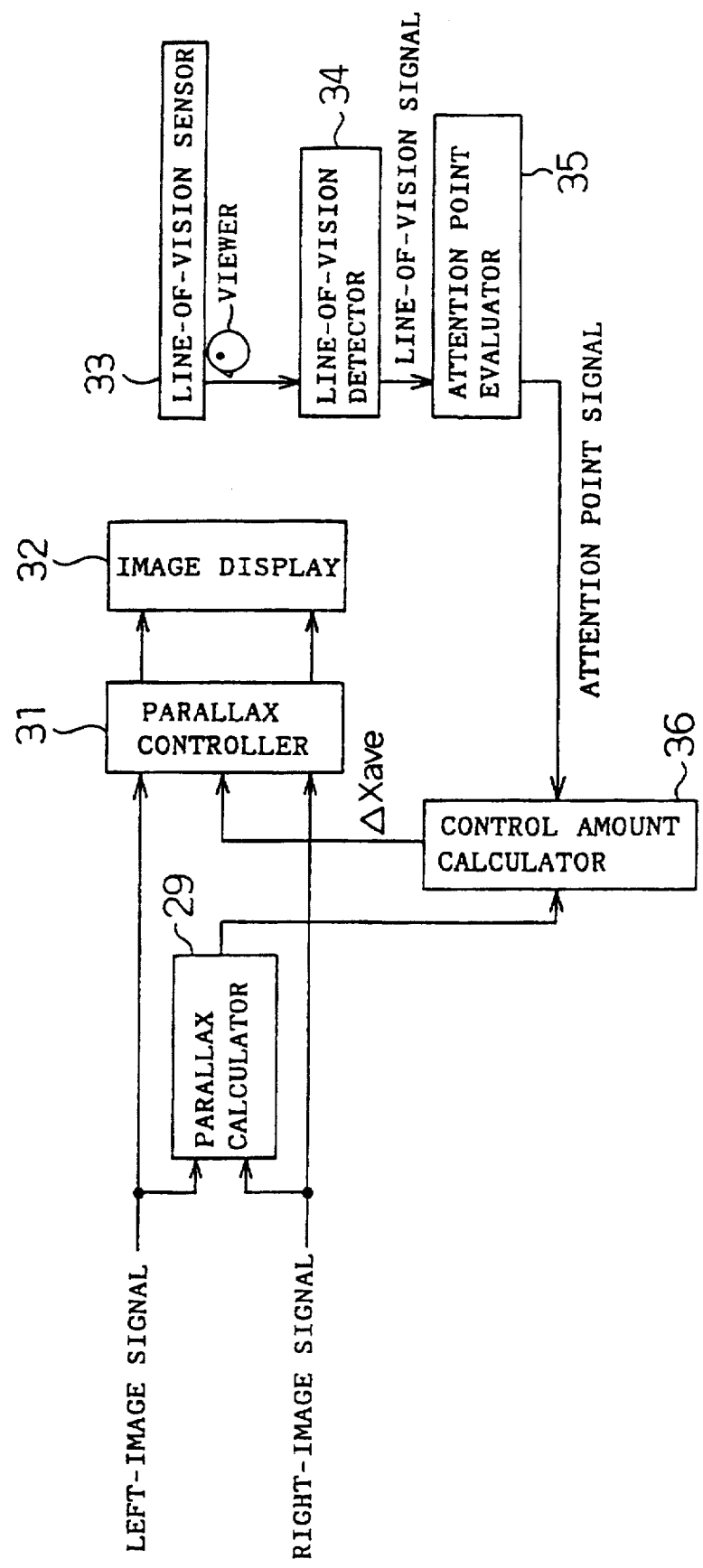
FIG. 19 is a diagram showing the configuration of a stereoscopic image display apparatus according to a fifth embodiment of the invention.

FIG. 19 is a diagram showing the configuration of a display section in a stereoscopic image pickup and display apparatus according to a fifth embodiment of the present invention. In FIG. 19, the numeral 29 is a parallax calculator, 31 is a parallax controller, and 32 is an image display. These components are the same as those shown in FIG. 16. The difference from the configuration shown in FIG. 16 is that the configuration of FIG. 19 has two additional functions: a line-of-sight sensor 33, a line-of-sight detector 34, and an fixating point evaluator 35 are provided, which together serve the function of measuring the line of vision (visual axis) that points to the position in a displayed image on which the viewer's eye is focused; and a control amount calculator 36 is provided to serve the function of controlling the amount of binocular parallax on the basis of the output of the parallax calculator and the information concerning the viewers' line of vision.

The operation of the thus constructed stereoscopic image display section of the fifth embodiment will be described below. First, the parallax calculator 29 calculates a parallax map (a three-dimensional map) from left- and right-eye images, as in the fourth embodiment of the invention. The same calculation method as used in the fourth embodiment may be used for the above calculation; for example, the correlation matching method may be used which calculates the correlations of luminance patterns between the left and right images using the algorithm shown in FIG. 4. Based on the thus obtained parallax map (showing parallax Δx calculated at each coordinate position on the entire screen), and on the position (fixating point) the viewer is viewing on the display screen of the image display 32, the control amount calculator 36 calculates the amount of displacement in horizontal read timing between the left and right images input as signals to the parallax controller 31.

Figures 20A, 20B:
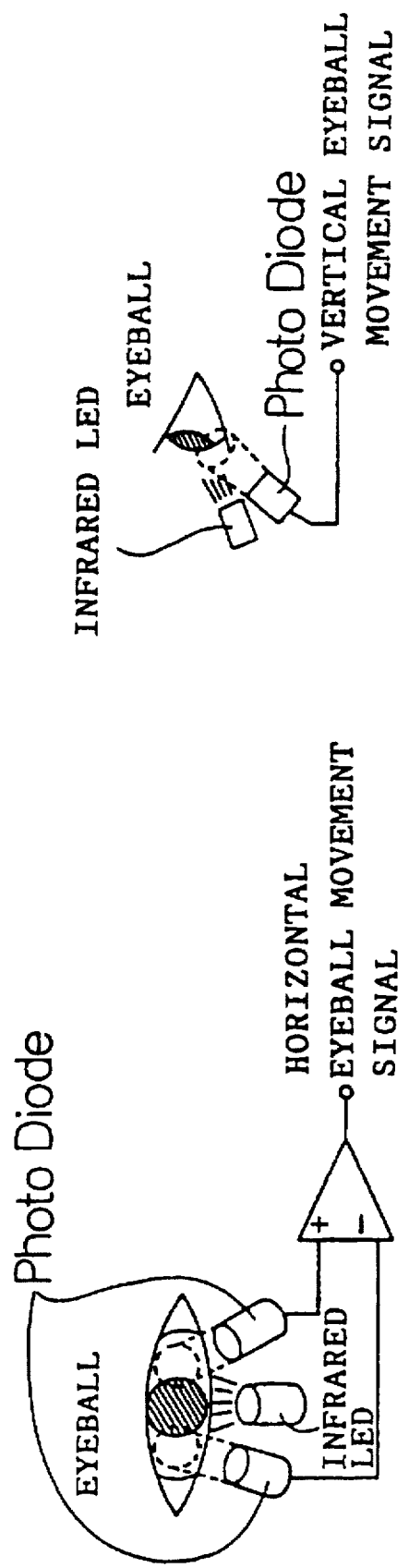
FIG. 20 is a diagram showing the operation of a line-of-vision sensor.
Figure 21:
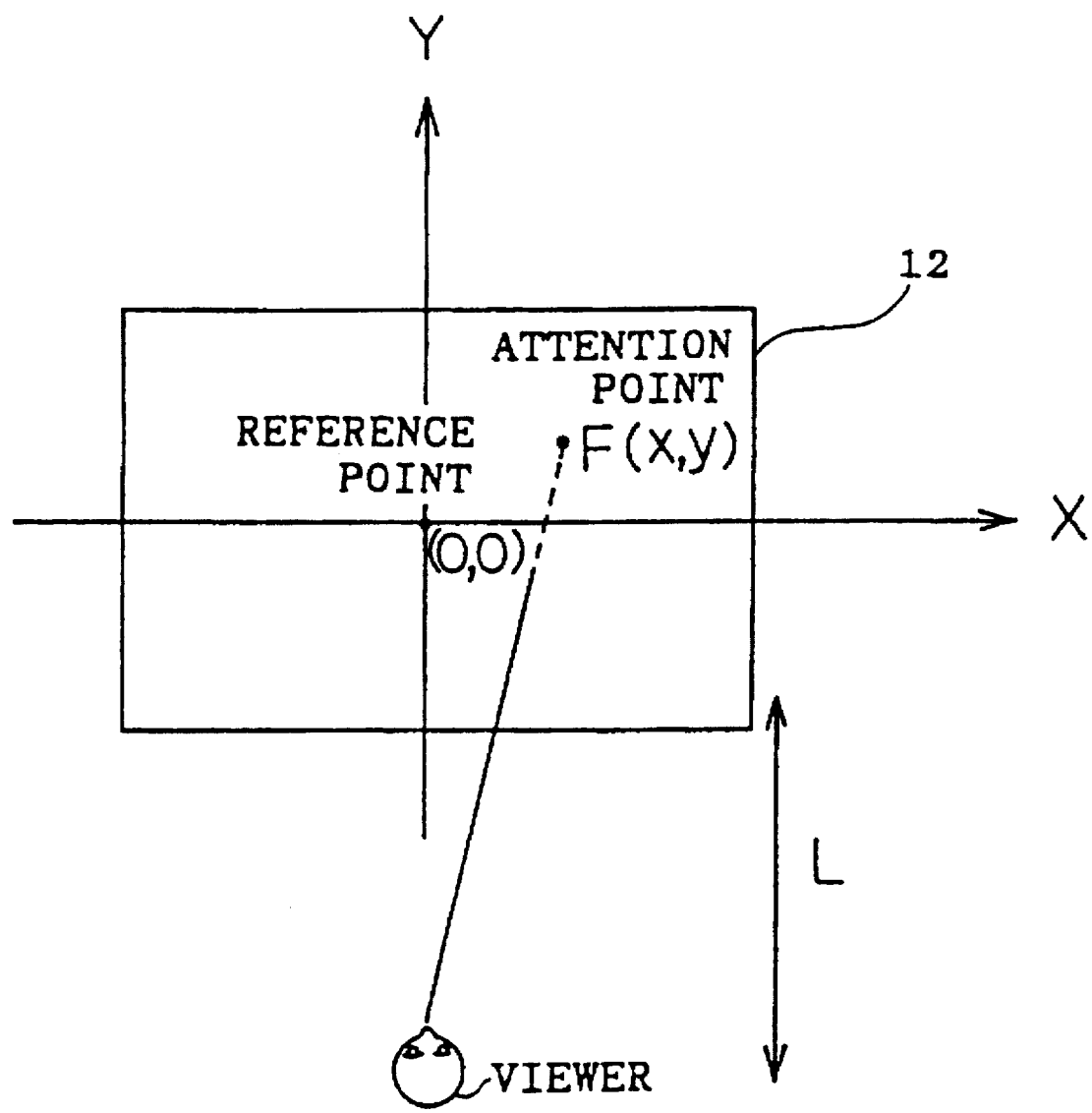
FIG. 21 is a diagram showing a method of calculating the coordinates of an fixating point in a displayed image.

We will now describe a method of detecting the viewer's fixating point (the point on which the viewer's eye is focused). First, the direction of the visual axis of the viewer's eyeball is detected using the line-of-sight sensor 33 and line-of-sight detector 34. There are many detection methods, such as a limbus reflection method, a corneal reflection method, and a method involving monitoring the eye using a TV camera. Any of these methods may be used, but the following description deals specifically with the limbus reflection method. FIG. 20 shows the operating principle of the line-of-sight sensor 33 in the limbus reflection method. FIG. 20(a) is a front view of an eyeball, and (b) is a side view of the same. To detect a horizontal movement of the eyeball, the eyeball is illuminated with a weak infrared beam from an infrared LED, and the infrared beam reflected from the eyeball is measured with photodiodes. The photodiodes are directed to positions on both sides of the iris as shown by dashed lines, and the difference between the outputs of the photodiodes is calculated by an operational amplifier, to detect a horizontal movement of the eyeball. To detect a vertical movement of the eyeball, an infrared beam is directed to the lower part of the eyeball, as shown in FIG. 20(b), and the reflected light is detected using a photodiode directed to the lower part of the iris. The thus obtained horizontal/vertical eyeball movement signals are converted by the line-of-sight detector 34 to a line-of-sight angle (line-of-sight signal). That is, the line of vision is measured in terms of horizontal angles, ax and ay, with respect to a predetermined reference point (the optic axis of the viewer's eyeball is directed in the direction indicated by the angles). Next, based on the line-of-sight signal, the fixating point evaluator 35 calculates the position on the image display 32 on which the viewer's eye is focused. More specifically, when the distance from the viewer to the display screen of the image display 32 is denoted by L, the reference point is set at the center of the display screen, and a two-dimensional coordinate system having its origin at the display screen center is defined, as shown in FIG. 21, then using the line-of-sight signal (ax, ay) the viewpoint F (x, y) defined in the two-dimensional screen coordinate system can be expressed as shown below.

$$x = L \times \tan(ax)$$ [Mathematical 17]

$$y = L \times \tan(ay)$$

Here, it is assumed that the viewer is positioned facing directly the center of the display screen, and that the display screen is not tilted with respect to the viewer.

Using the thus obtained viewer's fixating point on the screen (the point in an image on which the viewer's fixating is focused), the fixating point evaluator 35 calculates the coordinates of the point on which the viewer's eye is rested. FIG. 22(a) shows an example of time variation of the x component of the viewpoint F. When the viewer views points x1 to x5 in sequence as shown, the viewer's eyeballs move very quickly as the viewpoint changes from x1 to x2 to x3, and so on. Such eye movement is generally referred to as saccade. When the viewer blinks his eye, it is not possible to measure the viewpoint since rapid movements of the eyelid cause abrupt changes in the waveform. The fixating point evaluator 35 removes such transient states and detects the state (attention state) in which the viewer's eye is rested on any of the points x1 to x5. More specifically, the fixating point evaluator 35 calculates the moving speed of the viewpoint, and determines that the viewer's eye is in the fixating state (marked * in FIG. 22(b)) when the moving speed is less than a prescribed value β, as shown in FIG.

22(b). In the above calculation, only the x component of the viewpoint is used, but the fixating state may be detected by calculating a two-dimensional speed using both the x and y components. The time variation of the thus extracted viewer's fixating point is shown in FIG. 22(c).

Next, as shown in FIG. 22(d), positional data of the fixating point is filtered through a zero-order hold, interpolating the time where no fixating point data is available. Thereafter, the time variation of the fixating point thus detected is smoothed by a low-lass filter. In this manner, the fixating point evaluator 35 detects the position in the displayed image on which the viewer's fixating is focused, and supplies the result as the fixating point signal to the control amount calculator 36. In the above example, the fixating point signal is created by detecting the line-of-sight direction of one eye. Alternatively, the line-of-sight directions of both eyes may be detected, and the fixating point signal may be calculated by using the average value of these data.

Based on the thus obtained parallax map and fixating point signal, the control amount calculator 36 determines the control amount by which the parallax controller 32 controls the horizontal read timing of the left and right images. This operation will be described with reference to FIG. 23. F designates the viewer's fixating point indicated by an fixating point signal at a given time. With this point as the center, the binocular parallaxes $\Delta x$ shown on the parallax map are averaged over the range of M×M pixels. The result is taken as the average binocular parallax $\Delta x_{ave}$ which was explained in the fourth embodiment of the invention. Using this value, the parallax controller 31 controls the horizontal read timing of the left and right images, and moves the images horizontally. The control method is the same as that explained in the fourth embodiment with reference to FIG. 18. That is, the right image is shifted by the average binocular parallax $\Delta x_{ave}$ (the horizontal read timing of the image is shifted by $\Delta x_{ave}$).

In the fifth embodiment of the invention, the control amount calculator 36 takes the average of the binocular parallaxes within the square area having the fixating point as its center. Alternatively, their weighted average may be taken with greater weight at its center, as in the example shown in FIG. 17 in the fourth embodiment.

Further, in the present embodiment, the line-of-sight signal is detected based only on the optic axis direction of the viewer. This method is effective when the viewer's head stays relatively still. In a freer viewing condition, a human's line of vision is given as a combined value of the direction in which the eyeball is pointed and the direction in which the head is moved. Methods of detecting the line of vision by combining the head and eyeball movements include a method of detecting the head of a viewer by a TV camera, and a method using a magnetic field generator in conjunction with a magnetic field detector mounted on the viewer's head, as disclosed in Japanese Patent Unexamined Publication No. 4-182226. Any of these methods may be employed.

As described above, according to the present embodiment, since the binocular parallax at the position in an image that the viewer is currently viewing can be set at 0 (the image is reproduced at the position of the display screen) or at a desired value, the stereoscopic image is always formed around the image position intended by the viewer, enabling the viewer to perceive the stereoscopic depth of an object over the widest possible range.

Figure 24A:
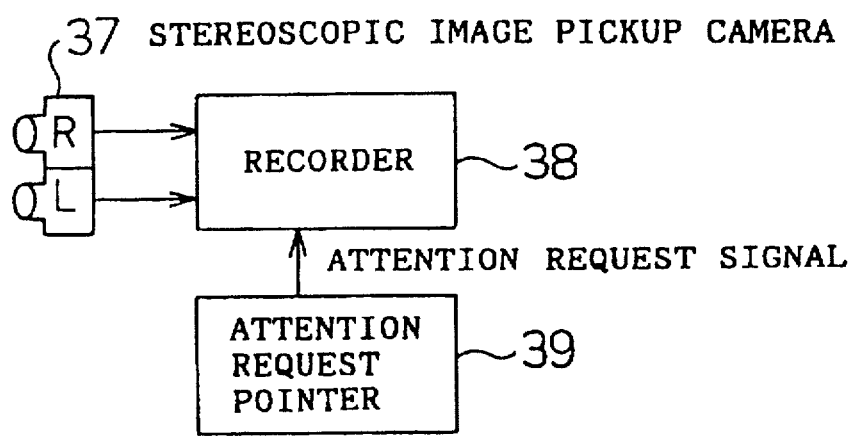
FIG. 24 is a diagram showing the configuration of a stereoscopic image display apparatus according to a sixth embodiment of the invention.

FIG. 24 is a diagram showing the configuration of a display section in a stereoscopic image pickup and display apparatus according to a sixth embodiment of the present invention. FIG. 24(a) shows a stereoscopic image recording section, and (b) shows a stereoscopic image display section. In FIG. 24, the numeral 29 is a parallax calculator, 31 is a parallax controller, 32 is an image display, and 36 is a control amount calculator. These components are the same as those used in the fifth embodiment of the invention (FIG. 19). The difference from the fifth embodiment is that a stereoscopic image pickup camera 37, a recorder 38, an fixating request pointer 39, and a reproducer 40 are added.

The operation of the thus constructed display section of the sixth embodiment will be described below. First, in FIG. 24(a), the operator shoots an object using the stereoscopic image pickup camera 37. The stereoscopic image pickup camera 37 can be a conventional stereoscopic camera consisting of two ordinary video cameras mounted side by side on a universal head, or the stereoscopic image pickup section of the first embodiment of the invention. Captured images are recorded by the recorder (consisting of two conventional VTRs synchronized to each other).

At this time, the operator inputs the position of the image on which the operator wishes the viewer to focus his fixating (an fixating request signal) by using the fixating request pointer 39. The fixating request signal is input using an ordinary pointing device, such as a mouse or tablet, and points to a given point in a captured image. This signal varies with time. The fixating request signal at a given time t is designated by Fix (xt, yt), where xt and yt are two-dimensional coordinate values designating the position in a captured image pointed to by the pointing device. This fixating request signal is recorded together with the captured image by using the recorder 38 (VTRs). More specifically, the fixating request signal is sampled at a field frequency of 60 Hz, and inserted in the video signal during each vertical retrace interval (vertical blanking period).

In an alternative arrangement, the fixating request pointer 39 may be attached to an editing machine or a VTR so that the fixating request signal may be recorded when editing the recorded image.

Figure 23:
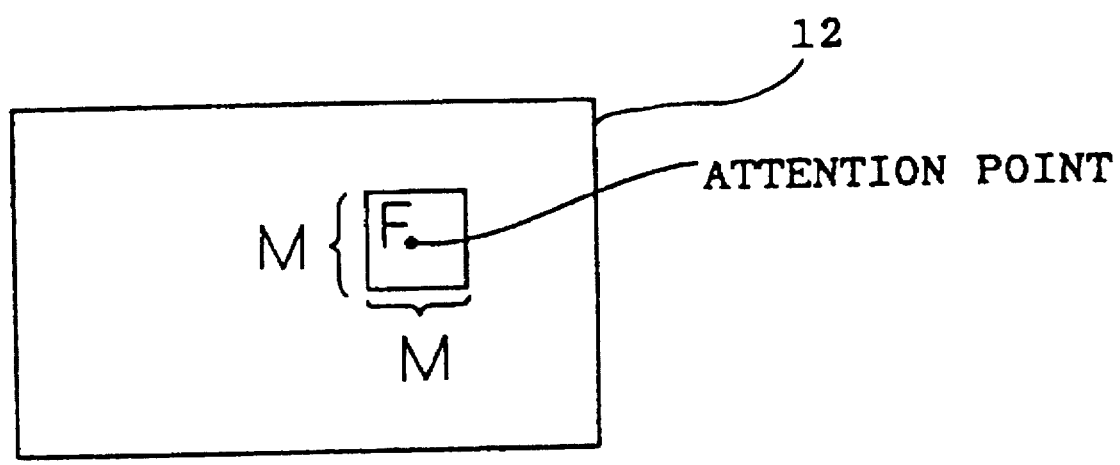
FIG. 23 is a diagram showing a method of calculating the control amount for horizontal read timing of left and right images.
Figure 24B:
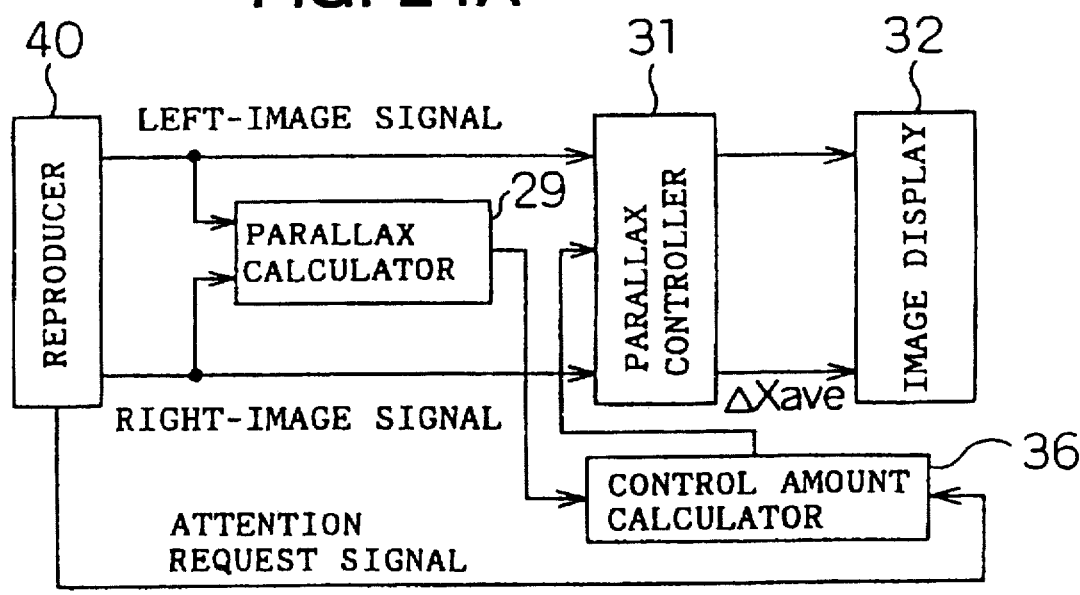

The thus recorded video signal and fixating request signal are processed in the stereoscopic image display section shown in FIG. 24(b), and stereoscopic images are produced for display. The reproducer 40 (VTRs) reproduces the video signal and fixating request signal. The remainder of the operation is the same as that described in the fifth embodiment of the invention (FIG. 19), except that the fixating point signal is replaced by the fixating request signal output from the reproducer 40. That is, based on the parallax map calculated by the parallax calculator 29 and on the fixating request signal reproduced by the reproducer 40, the control amount calculator 36 determines the control amount by which the parallax controller 32 controls the horizontal read timing of the left and right images. As shown in FIG. 23 in the fifth embodiment of the invention, the binocular parallaxes $\Delta x$ shown on the parallax map are averaged over the M×M-pixel area centered around the image position on which the fixating request signal requests the viewer to focus his fixating. The result is taken as the average binocular parallax $\Delta x_{ave}$ which was explained in the fourth embodiment of the invention. Using this value, the parallax controller 31 controls the horizontal read timing of the left and right images, and moves the images horizontally. The control method is the same as that explained with reference to FIG. 18. That is, the right image is shifted by the average binocular parallax $\Delta x_{ave}$ (the horizontal read timing of the image is shifted by $\Delta x_{ave}$).

In FIG. 24, instead of reproducing the fixating request signal by the reproducer 40, the output of the fixating request pointer 39 may be fed directly to the control amount calculator 36 so that the viewer may input the fixating request signal while viewing the reproduced image.

The fourth to sixth embodiment have dealt only with binocular stereoscopic images, but it will be recognized that, in a multinocular stereoscopic image display apparatus also, the same processing as described above can be applied to two images to be projected into the viewer's left and right eyes. In this case, however, since a plurality of left- and right-eye image pairs are presented for viewing at the same time, the same processing needs to be applied to each of the images.

As described above, according to the present embodiment, by controlling the readout position of the stereoscopic image using the fixating request signal, the visual program producer, the camera operator, or the viewer can bring the desired portion of the image onto the surface of the display screen or onto other desired position; as a result, the stereoscopic image is always formed with a wide fusing range around the image position intended by the viewer, enabling the viewer to perceive the stereoscopic depth of an object over the widest possible range.

Figure 25:
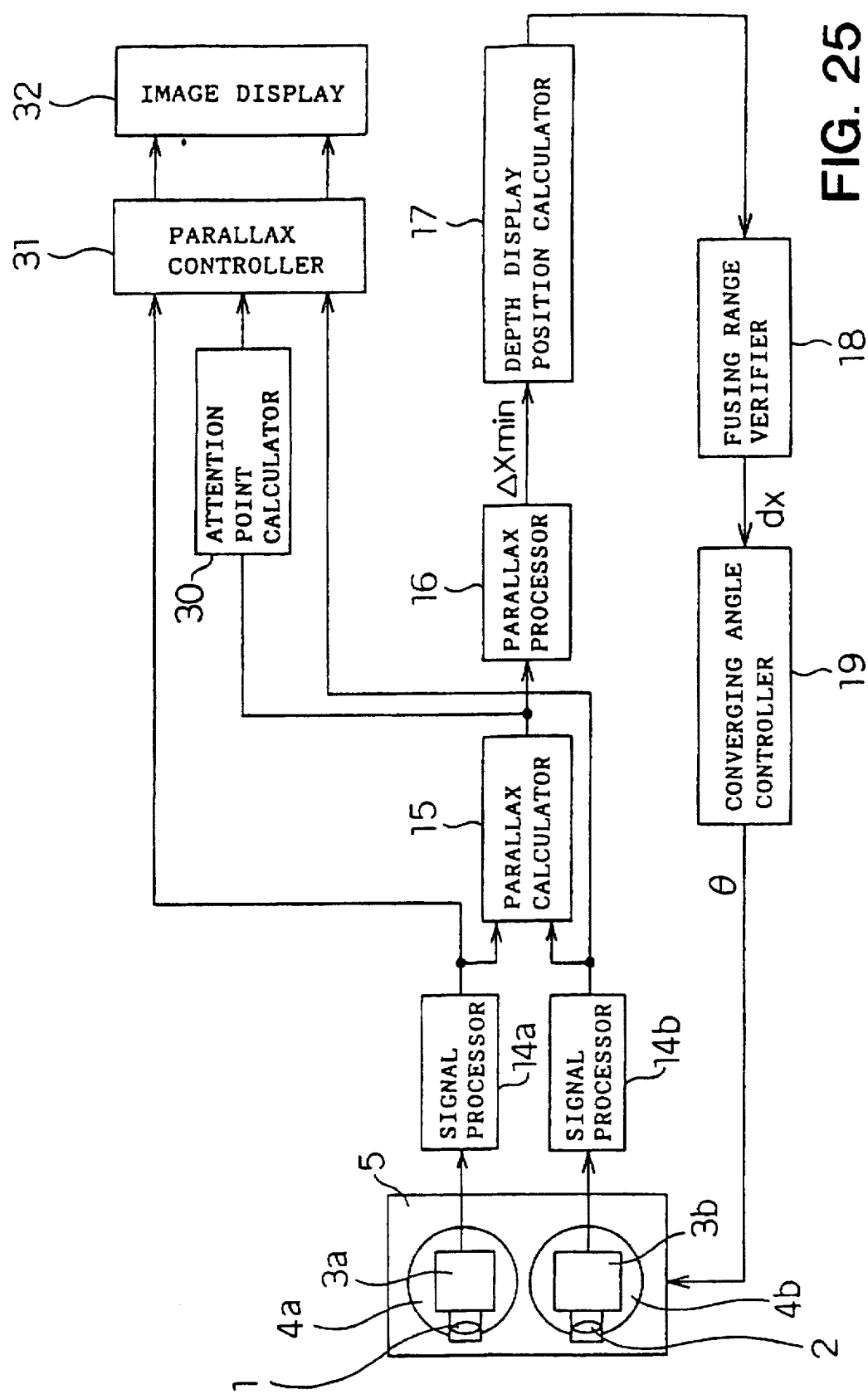
FIG. 25 is a diagram showing the configuration of a stereoscopic image display apparatus according to a seventh embodiment of the invention.

FIG. 25 is a diagram showing the configuration of a stereoscopic image pickup and display apparatus according to a seventh embodiment of the present invention. In the figure, the numerals 1 and 2 are lenses, 3a and 3b are camera bodies, 4a and 4b are rotation controllers, 5 is a camera spacing controller, 14a and 14b are signal processors each for converting the camera signal into the luminance signal, 15 is a parallax calculator for calculating horizontal parallax from left and right images, 16 is a parallax processor for detecting the smallest parallax, 17 is a depth display position calculator for calculating the spatial position of an object nearest to the viewer, 18 is a fusing range verifier for verifying whether the spatial position of the object nearest to the viewer is within the fusing range of the viewer's eyes, and 19 is a converging angle controller for controlling the rotation controllers 4a, 4b so that the spatial position of the object nearest to the viewer comes within the fusing range of the viewer's eyes. These components are the same as those of the image pickup section (FIG. 1) in the stereoscopic image pickup and display apparatus of the present invention. Further, the numeral 30 is an fixating point calculator, 31 is a parallax controller, and 32 is an image display. These components are the same as those of the display section (FIG. 16) in the stereoscopic image pickup and display apparatus of the fourth embodiment of the invention.

That is, in the seventh embodiment of the invention, both the image pickup section and the display section are controlled so that the presented stereoscopic image comes within the binocular fusing range of the viewer. The operation of the thus constructed stereoscopic image pickup and display apparatus of the seventh embodiment will be described below. First, in shooting an object, control is performed so that dx in FIG. 2(a) will have the largest possible value while satisfying the condition that enables all stereoscopic images to be reproduced within the fusional range. This operation is exactly the same as that described in the first embodiment of the invention. A brief description will be given here. To achieve the above condition, dx is initially set to ∞ (sufficiently large value). In FIG. 25, the parallax calculator 15 calculates a parallax map (a three-dimensional map showing parallax Δx calculated at each coordinate position on the entire screen) from the left- and right-eye images output from the signal processors 14a and 14b.

Based on this parallax map, the parallax processor 16 extracts the smallest parallax (the parallax of the object reproduced nearest to the viewer) from the entire screen, and takes the result as Δxmin. Next, based on Δxmin, the depth display position calculator 17 calculates the depth display position Ypmin of the stereoscopic image in the stereoscopic image presentation diagram shown in FIG. 5, as follows.

$$Y_{Pmin\ (max)} = \frac{2We \cdot ds}{-M \cdot \frac{\Delta x_{min}}{max} - 2 \cdot \Delta S + 2We} \quad \text{[Mathematical 5]}$$

If this Ypmin is within the binocular fusing range, the current dx value is taken as is. If $$YPmin > F(ds)min + \Delta F \quad \text{[Mathematical 7]}$$

a small value Δdx is added to dx. If $$YPmin < F(ds)min - \Delta F \quad \text{[Mathematical 8]}$$

a small value Δdx is subtracted from dx. These calculations are exactly the same as those described in the first embodiment of the invention. Using the thus obtained dx value, the converging angle controller 19 controls the rotation controllers 4a and 4b. In this manner, control is performed so that Ypmin, the point in the object nearest to the viewer, becomes equal to F(ds)min, a point near the limit of the fusing range.

Using the output of the parallax calculator 15, the fixating point calculator 30 obtains the average parallax or the weighted average parallax Δxave for the entire screen, in accordance with which the parallax controller 31 scrolls the left and right images in such a manner as to eliminate the displacement of Δxave between the left and right images. This processing is exactly the same as that described in the fourth embodiment of the invention.

In the above operation, the converging point of the image pickup section and the displayed image position are controlled so that the stereoscopic image displayed by the image display 32 comes within the binocular fusing range of the viewer. As a result, stereoscopic images with wide binocular fusing range can always be presented to the viewer, and eye strain during viewing can be reduced.

In the above description of the seventh embodiment of the invention, the converging angle controller 19 and parallax controller 31 are operated simultaneously. Alternatively, to ensure the stability of the entire system operation, these two controllers may be operated in turn, or one controller may be operated after the operation of the other controller has stabilized.

As described, according to the present invention, binocular parallax between images is detected, based on which the optimum converging point of the cameras is calculated that enables the viewer to perceive the stereoscopic depth of an object with the widest possible range, and the cameras are controlled so that their optic axes are directed to the converging point; further, the displayed image is automatically controlled so that the widest possible binocular fusing range can be provided for the displayed image, thereby achieving the presentation of stereoscopic images that help to reduce eye strain.

What is claimed is:

1. A stereoscopic image display apparatus comprising:
   a fixating request pointer for specifying a portion of a captured image on which an operator wishes a viewer to focus his fixating and producing a fixation request signal;
   a signal recorder for recording the fixation request signal of said fixating request pointer and left and right images of an object captured from two different angles;
   a reproducer for reproducing the recorded left and right images and the fixating request signal which is representative of the output of said fixating request pointer;

a parallax calculator for calculating and outputting a binocular parallax or three-dimensional position of the object directly from only the reproduced left and right images of the object captured from two different angles using block-matching between said left and right images; and a parallax controller for moving the reproduced left and right images in opposite directions horizontally on the basis of an output of said parallax calculator as well as the reproduced fixating request signal so that an image portion indicated by the reproduced fixating request signal is reproduced near a boundary of a viewer's fusional range, and so that a moving distance of the reproduced left and right images become smallest, thereby reducing the three-dimensional distortion of the displayed image.

2. A stereoscopic image pickup and display apparatus comprising:

an image pickup device for capturing an object from a plurality of viewpoints;

a converging angle moving mechanism for varying the converging angle of said image pickup device;

a signal processor for extracting image data from said image pickup device;

a parallax calculator for calculating a parallax of an image by using an output of said signal processor using block-matching between said images representative of the plurality of viewpoints;

a parallax processor for detecting the smallest value (a parallax of the nearest object) out of outputs from said parallax calculator;

a depth display position calculator for calculating from said smallest value of parallax detected by said parallax processor a depthwise position of said nearest object to be reproduced at the nearest point when a captured image is displayed by a stereoscopic image display device;

a fusing range verifier for verifying on the basis of an output of said depth display position calculator whether said depthwise position of said nearest object calculated by said depth display position calculator is within a fusional range of a viewer when the viewer views the reproduced image;

a converging angle controller for controlling said converging angle moving mechanism when said fusional range verifier determines that said depthwise position of said nearest object is not within the fusional range of the viewer, in order to change said converging angle so that depthwise position of said nearest object enters into the fusional range of the viewer, thereby minimizing three-dimensional distortion of the image display device;

a fixating request pointer for specifying a portion of a captured image on which an operator wishes the viewer to focus his fixating;

a signal recorder for recording a fixating request signal from said fixating request pointer and left and right images of an object captured from two different angles;

a reproducer for reproducing the recorded left and right images and the recorded fixating request signal representative of the output of said fixating request pointer;

said parallax calculator further for calculating the binocular parallax or three-dimensional position of the object from the reproduced left and right images of the object captured from two different angles using block-matching between the reproduced left and right images; and a parallax controller for performing control of the reproduced left and right images in opposite direction horizontally on the basis of an output of said parallax calculator as well as the reproduced fixating request signal so that an image portion indicated by the fixating request signal is reproduced near a boundary of a viewer's fusional range, and so that a moving distance of the reproduced left and fight images become smallest, thereby reducing the three-dimensional distortion of the displayed image.

* * * * *

UNITED STATES PATENT AND TRADEMARK OFFICE
CERTIFICATE OF CORRECTION

PATENT NO. : 5,726,704
DATED : March 10, 1998
INVENTOR(S) : Kenya Uomori

It is certified that error appears in the above-identified patent and that said Letters Patent is hereby corrected as shown below:

Column 20,
Line 5, please delete [Mathematical 5] and replace it with the following:

$$-- Y_{Pmin(max)} = \frac{2We \cdot ds}{-M \cdot \Delta X_{min} - 2 \cdot \Delta S + 2We_{(max)}} --$$

[Mathematical 5]

Signed and Sealed this

Ninth Day of October, 2001

Attest:

*Nicholas P. Godici*

NICHOLAS P. GODICI
*Attesting Officer*    *Acting Director of the United States Patent and Trademark Office*